United States Patent
Wang et al.

(10) Patent No.: US 10,432,327 B2
(45) Date of Patent: Oct. 1, 2019

(54) ANTENNA ARRAY CALIBRATION METHOD AND APPARATUS

(71) Applicant: Huawei Technologies Co., Ltd., Shenzhen, Guangdong, P.R. (CN)

(72) Inventors: Xiaoyi Wang, Shenzhen (CN); Sergey Nikolaevich Dudorov, Moscow (RU); Penghuai Li, Shanghai (CN); Yuxiang Xiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/261,056

(22) Filed: Jan. 29, 2019

(65) Prior Publication Data
US 2019/0158194 A1    May 23, 2019

Related U.S. Application Data

(63) Continuation of application No. PCT/CN2016/092466, filed on Jul. 30, 2016.

(51) Int. Cl.
H04B 17/12  (2015.01)

(52) U.S. Cl.
CPC ........................ *H04B 17/12* (2015.01)

(58) Field of Classification Search
CPC ........ H01Q 3/267; H01Q 3/26; G01S 13/343; G01S 13/89; G01S 2007/403; G01S 2007/4034; G01S 2013/0245; G01S 7/35; G01S 7/4026; H04B 17/12; H04B 17/21; H04B 17/336; H04B 7/0417; H04B 7/063

USPC ........................................................ 342/174
See application file for complete search history.

(56) References Cited

U.S. PATENT DOCUMENTS

| | | | |
|---|---|---|---|
| 8,280,430 | B2 | 10/2012 | Naguib et al. |
| 2009/0153394 | A1 | 6/2009 | Navarro et al. |
| 2013/0016003 | A1 | 1/2013 | Stirling-Gallacher et al. |

FOREIGN PATENT DOCUMENTS

| | | |
|---|---|---|
| CN | 102315868 A | 1/2012 |
| CN | 102623805 A | 8/2012 |
| CN | 103475395 A | 12/2013 |
| CN | 103916168 A | 7/2014 |
| CN | 104601257 A | 5/2015 |
| CN | 104954083 A | 9/2015 |
| TW | 201618379 A | 5/2016 |

*Primary Examiner* — Timothy X Pham
(74) *Attorney, Agent, or Firm* — Slater Matsil, LLP

(57) ABSTRACT

An antenna array calibration method and apparatus are provided. The method includes: when first target antennas in an antenna array transmit signals, and second target antennas in the antenna array receive the signals, calculating calibration compensation values of transmit channels in the first target antennas and calibration compensation values of receive channels in the second target antennas; and when the second target antennas transmit signals, and the first target antennas receive the signals, calculating calibration compensation values of transmit channels in the second target antennas and calibration compensation values of receive channels in the first target antennas.

12 Claims, 10 Drawing Sheets

When first target antennas in an antenna array transmit calibration signals, and second target antennas in the antenna array receive the calibration signals, separately determine, based on a difference value between each of amplitude-phase responses of transmit channels corresponding to antennas in the first target antennas and an amplitude-phase response of a third antenna dummy element, calibration compensation values of the transmit channels corresponding to the antennas in the first target antennas, and perform calibration processing on the transmit channels corresponding to the antennas in the first target antennas — 101

Separately determine, based on a difference value between each of amplitude-phase responses of receive channels corresponding to antennas in the second target antennas and an amplitude-phase response of a fourth antenna dummy element, calibration compensation values of the receive channels corresponding to the antennas in the second target antennas, and perform calibration processing on the receive channels corresponding to the antennas in the second target antennas — 102

When the second target antennas transmit calibration signals, and the first target antennas receive the calibration signals, separately determine, based on a difference value between each of amplitude-phase responses of transmit channels corresponding to the antennas in the second target antennas and an amplitude-phase response of a second antenna dummy element, calibration compensation values of the transmit channels corresponding to the antennas in the second target antennas, and perform calibration processing on the transmit channels corresponding to the antennas in the second target antennas — 103

Separately determine, based on a difference value between each of amplitude-phase responses of receive channels corresponding to the antennas in the first target antennas and an amplitude-phase response of a first antenna dummy element, calibration compensation values of the receive channels corresponding to the antennas in the first target antennas, and perform calibration processing on the receive channels corresponding to the antennas in the first target antennas — 104

FIG. 1

CONT.
FROM
FIG. 6A

When first target antennas transmit calibration signals, and second target antennas receive the calibration signals, separately determine, based on a difference value between amplitude-phase responses of transmit channels corresponding to antennas in the first target antennas, calibration compensation values of the transmit channels corresponding to the antennas in the first target antennas, and perform calibration processing on the transmit channels corresponding to the antennas in the first target antennas; and separately determine, based on a difference value between amplitude-phase responses of receive channels corresponding to antennas in the second target antennas, calibration compensation values of the receive channels corresponding to the antennas in the second target antennas, and perform calibration processing on the receive channels corresponding to the antennas in the second target antennas — 605

When the second target antennas transmit calibration signals, and the first target antennas receive the calibration signals, separately determine, based on a difference value between amplitude-phase responses of transmit channels corresponding to the antennas in the second target antennas, calibration compensation values of the transmit channels corresponding to the antennas in the second target antennas, and perform calibration processing on the transmit channels corresponding to the antennas in the second target antennas; and separately determine, based on a difference value between amplitude-phase responses of receive channels corresponding to the antennas in the first target antennas, calibration compensation values of the receive channels corresponding to the antennas in the first target antennas, and perform calibration processing on the receive channels corresponding to the antennas in the first target antennas — 606

FIG. 6B

ANTENNA ARRAY CALIBRATION METHOD AND APPARATUS

CROSS-REFERENCE TO RELATED APPLICATIONS

This application is a continuation of International Application No. PCT/CN2016/092466 filed on Jul. 30, 2016, the disclosure of which is hereby incorporated by reference in its entirety.

TECHNICAL FIELD

The present application relates to the field of communications technologies, and in particular, to an antenna array calibration method and apparatus.

BACKGROUND

As a communications service volume drastically increases, a requirement on a throughput rate of a communications system becomes increasingly higher. In a wireless communications system, massive multiple input multiple output (massive MIMO) and beamforming are important technical means for increasing a system throughput rate, and a premise for effective beamforming implementation is to calibrate an antenna array and a transceiver channel. Antenna calibration includes consistency calibration and reciprocity calibration. The consistency calibration makes amplitude-phase characteristics of all receive channels be the same and amplitude-phase characteristics of all transmit channels be the same, and the reciprocity calibration makes ratios of amplitude-phase characteristics of a same transceiver channel be the same. Currently, calibration is usually performed by using a hardware-to-network coupling method. However, as an antenna quantity increases and a hardware size decreases, a conventional hardware-to-network coupling calibration method causes an increasingly higher requirement on a hardware design difficulty and algorithm. Based on this, calibration using an antenna air interface coupling feature is becoming popular. A conventional implementation process is generally as follows: A transmit-side antenna successively and wirelessly broadcasts calibration signals, and receives a calibration signal sent by another antenna; a calibration coefficient is initialized; calibration coefficients of all antennas are successively and iteratively updated; whether an error between two consecutive rounds of calibration coefficients meets a preset threshold is determined; and if the error meets the preset threshold, a calibration matrix is generated, and calibration ends. However, in the foregoing conventional air interface coupling calibration method, consistency of an antenna array cannot be calibrated, and only reciprocity of the antenna array and a radio frequency channel can be calibrated. Performing only reciprocity calibration but neglecting consistency calibration greatly affects broadcast beamforming, and causes a specific loss to signal transmit power. Therefore, how to implement antenna consistency calibration by using the antenna air interface coupling feature is a key problem that urgently needs to be resolved currently.

SUMMARY

Embodiments of the present disclosure disclose an antenna array calibration method and apparatus, so as to implement consistency calibration on an antenna array by using an antenna air interface coupling feature.

A first aspect of an embodiment of the present disclosure discloses an antenna array calibration method, where an antenna array includes first target antennas and second target antennas, a first antenna dummy element and a second antenna dummy element are added on one end of the antenna array, a third antenna dummy element and a fourth antenna dummy element are added on the other end of the antenna array, the first antenna dummy element and the fourth antenna dummy element are configured to receive calibration signals, the second antenna dummy element and the third antenna dummy element are configured to transmit calibration signals, an amplitude-phase response of the first antenna dummy element is the same as an amplitude-phase response of the fourth antenna dummy element, an amplitude-phase response of the second antenna dummy element is the same as an amplitude-phase response of the third antenna dummy element, a difference value between coupling factors of adjacent antennas in the antenna array is less than a preset value, and the method includes:

when the first target antennas transmit calibration signals, and the second target antennas receive the calibration signals, separately determining, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and performing calibration processing on the transmit channels corresponding to the antennas in the first target antennas, so that the amplitude-phase responses of the transmit channels corresponding to the antennas in the first target antennas are consistent;

separately determining, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and performing calibration processing on the receive channels corresponding to the antennas in the second target antennas, so that the amplitude-phase responses of the receive channels corresponding to the antennas in the second target antennas are consistent;

when the second target antennas transmit calibration signals, and the first target antennas receive the calibration signals, separately determining, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and performing calibration processing on the transmit channels corresponding to the antennas in the second target antennas, so that the amplitude-phase responses of the transmit channels corresponding to the antennas in the second target antennas are consistent; and separately determining, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and performing calibration processing on the receive channels corresponding to the antennas in the first target antennas, so that the amplitude-phase responses of the receive channels corresponding to the antennas in the first target antennas are consistent.

The amplitude-phase response of the first antenna dummy element is the same as the amplitude-phase response of the fourth antenna dummy element, so that the amplitude-phase responses of the receive channels corresponding to the antennas in the first target antennas are consistent with the amplitude-phase responses of the receive channels corresponding to the antennas in the second target antennas. In other words, amplitude-phase responses of receive channels corresponding to all antennas included in the antenna array are consistent, so as to implement calibration on the receive channels of all the antennas. In addition, the amplitude-phase response of the second antenna dummy element is the same as the amplitude-phase response of the third antenna dummy element, so that the amplitude-phase responses of the transmit channels corresponding to the antennas in the first target antennas are consistent with the amplitude-phase responses of the transmit channels corresponding to the antennas in the second target antennas. In other words, amplitude-phase responses of transmit channels corresponding to all the antennas included in the antenna array are consistent, so as to implement calibration on the transmit channels of all the antennas. Based on this, consistency calibration on the antenna array can be implemented.

With reference to the first aspect of the embodiment of the present disclosure, in a first possible implementation of the first aspect of the embodiment of the present disclosure, a calibration signal transmitted by an antenna in the antenna array is an orthogonal frequency division multiplexing OFDM signal, and subcarriers corresponding to each antenna in the antenna array are divided with a transmission comb comb N in a frequency division manner, where N is greater than or equal to a quantity of antennas included in the antenna array.

With reference to the first aspect or the first possible implementation of the first aspect of the embodiment of the present disclosure, in a second possible implementation of the first aspect of the embodiment of the present disclosure, the first target antennas are odd-numbered antennas in the antenna array, and the second target antennas are even-numbered antennas in the antenna array.

With reference to the first aspect or the first possible implementation of the first aspect of the embodiment of the present disclosure, in a third possible implementation of the first aspect of the embodiment of the present disclosure, the first target antennas are even-numbered antennas in the antenna array, and the second target antennas are odd-numbered antennas in the antenna array.

A second aspect of an embodiment of the present disclosure discloses an antenna array calibration method, where an antenna array includes first target antennas and second target antennas, a receive coupling component is added between a first antenna in the first target antennas and a second antenna in the second target antennas, a transmit coupling component is added between a third antenna in the first target antennas and a fourth antenna in the second target antennas, the receive coupling component is configured to couple and receive calibration signals, the transmit coupling component is configured to transmit and couple calibration signals, a difference value between coupling factors of adjacent antennas in the antenna array is less than a preset value, and the method includes:

controlling the first antenna and the second antenna to separately transmit calibration signals, and receiving the calibration signals by using the receive coupling component;

separately determining, based on the calibration signals received by the receive coupling component, the calibration signal transmitted by the first antenna, and the calibration signal transmitted by the second antenna, a calibration compensation value of a transmit channel corresponding to the first antenna and a calibration compensation value of a transmit channel corresponding to the second antenna, and separately performing calibration processing on the transmit channel corresponding to the first antenna and the transmit channel corresponding to the second antenna, so that an amplitude-phase response of the transmit channel corresponding to the first antenna is consistent with an amplitude-phase response of the transmit channel corresponding to the second antenna;

transmitting calibration signals by using the transmit coupling component, and controlling the third antenna and the fourth antenna to separately receive the calibration signals;

separately determining, based on the calibration signals transmitted by the transmit coupling component, the calibration signal received by the third antenna, and the calibration signal received by the fourth antenna, a calibration compensation value of a receive channel corresponding to the third antenna and a calibration compensation value of a receive channel corresponding to the fourth antenna, and separately performing calibration processing on the receive channel corresponding to the third antenna and the receive channel corresponding to the fourth antenna, so that an amplitude-phase response of the receive channel corresponding to the third antenna is consistent with an amplitude-phase response of the receive channel corresponding to the fourth antenna;

when the first target antennas transmit calibration signals, and the second target antennas receive the calibration signals, separately determining, based on a difference value between amplitude-phase responses of transmit channels corresponding to antennas in the first target antennas, calibration compensation values of the transmit channels corresponding to the antennas in the first target antennas, and performing calibration processing on the transmit channels corresponding to the antennas in the first target antennas, so that the amplitude-phase responses of the transmit channels corresponding to the antennas in the first target antennas are consistent;

separately determining, based on a difference value between amplitude-phase responses of receive channels corresponding to antennas in the second target antennas, calibration compensation values of the receive channels corresponding to the antennas in the second target antennas, and performing calibration processing on the receive channels corresponding to the antennas in the second target antennas, so that the amplitude-phase responses of the receive channels corresponding to the antennas in the second target antennas are consistent;

when the second target antennas transmit calibration signals, and the first target antennas receive the calibration signals, separately determining, based on a difference value between amplitude-phase responses of transmit channels corresponding to the antennas in the second target antennas, calibration compensation values of the transmit channels corresponding to the antennas in the second target antennas, and performing calibration processing on the transmit channels corresponding to the antennas in the second target antennas, so that the amplitude-phase responses of the transmit channels corresponding to the antennas in the second target antennas are consistent; and separately determining, based on a difference value between amplitude-phase responses of receive channels corresponding to the antennas in the first target antennas, calibration compensation values of the receive channels corresponding to the antennas in the first target antennas, and performing calibration processing on the receive channels corresponding to the antennas in the first target antennas, so that the amplitude-phase responses of the receive channels corresponding to the antennas in the first target antennas are consistent.

The amplitude-phase response of the transmit channel corresponding to the first antenna is consistent with the amplitude-phase response of the transmit channel corresponding to the second antenna, so that the amplitude-phase responses of the transmit channels corresponding to the antennas in the first target antennas are consistent with the amplitude-phase responses of the transmit channels corresponding to the antennas in the second target antennas. In other words, amplitude-phase responses of transmit channels corresponding to all antennas included in the antenna array are consistent, so as to implement calibration on the transmit channels of all the antennas. In addition, the amplitude-phase response of the receive channel corresponding to the third antenna is consistent with the amplitude-phase response of the receive channel corresponding to the fourth antenna, so that the amplitude-phase responses of the receive channels corresponding to the antennas in the first target antennas are consistent with the amplitude-phase responses of the receive channels corresponding to the antennas in the second target antennas. In other words, amplitude-phase responses of receive channels corresponding to all the antennas included in the antenna array are consistent, so as to implement calibration on the receive channels of all the antennas. Based on this, consistency calibration on the antenna array can be implemented.

With reference to the second aspect of the embodiment of the present disclosure, in a first possible implementation of the second aspect of the embodiment of the present disclosure, a calibration signal transmitted by an antenna in the antenna array is an orthogonal frequency division multiplexing OFDM signal, and subcarriers corresponding to each antenna in the antenna array are divided with a transmission comb comb M in a frequency division manner, where M is greater than or equal to a quantity of antennas included in the antenna array.

With reference to the second aspect or the first possible implementation of the second aspect of the embodiment of the present disclosure, in a second possible implementation of the second aspect of the embodiment of the present disclosure, the first target antennas are odd-numbered antennas in the antenna array, and the second target antennas are even-numbered antennas in the antenna array.

With reference to the second aspect or the first possible implementation of the second aspect of the embodiment of the present disclosure, in a third possible implementation of the second aspect of the embodiment of the present disclosure, the first target antennas are even-numbered antennas in the antenna array, and the second target antennas are odd-numbered antennas in the antenna array.

A third aspect of an embodiment of the present disclosure discloses an antenna array calibration apparatus, including a processor, a memory, an antenna array, a first antenna dummy element, a second antenna dummy element, a third antenna dummy element, and a fourth antenna dummy element, where the antenna array includes first target antennas and second target antennas, the first antenna dummy element and the fourth antenna dummy element are configured to receive calibration signals, the second antenna dummy element and the third antenna dummy element are configured to transmit calibration signals, an amplitude-phase response of the first antenna dummy element is the same as an amplitude-phase response of the fourth antenna dummy element, an amplitude-phase response of the second antenna dummy element is the same as an amplitude-phase response of the third antenna dummy element, a difference value between coupling factors of adjacent antennas in the antenna array is less than a preset value, the memory is configured to store a program and data, and the processor is configured to invoke the program stored in the memory, to perform the following steps:

when the first target antennas transmit calibration signals, and the second target antennas receive the calibration signals, separately determining, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and performing calibration processing on the transmit channels corresponding to the antennas in the first target antennas;

separately determining, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and performing calibration processing on the receive channels corresponding to the antennas in the second target antennas;

when the second target antennas transmit calibration signals, and the first target antennas receive the calibration signals, separately determining, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and performing calibration processing on the transmit channels corresponding to the antennas in the second target antennas; and separately determining, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and performing calibration processing on the receive channels corresponding to the antennas in the first target antennas.

With reference to the third aspect of the embodiment of the present disclosure, in a first possible implementation of the third aspect of the embodiment of the present disclosure, a calibration signal transmitted by an antenna in the antenna array is an orthogonal frequency division multiplexing OFDM signal, and subcarriers corresponding to each antenna in the antenna array are divided with a transmission comb comb N in a frequency division manner, where N is greater than or equal to a quantity of antennas included in the antenna array.

With reference to the third aspect or the first possible implementation of the third aspect of the embodiment of the present disclosure, in a first possible implementation of the third aspect of the embodiment of the present disclosure, the first target antennas are odd-numbered antennas in the antenna array, and the second target antennas are even-numbered antennas in the antenna array.

With reference to the third aspect or the first possible implementation of the third aspect of the embodiment of the present disclosure, in a second possible implementation of the third aspect of the embodiment of the present disclosure, the first target antennas are even-numbered antennas in the antenna array, and the second target antennas are odd-numbered antennas in the antenna array.

A fourth aspect of an embodiment of the present disclosure discloses an antenna array calibration apparatus, including a processor, a memory, an antenna array, a receive coupling component, and a transmit coupling component, where the antenna array includes first target antennas and second target antennas, the receive coupling component is separately connected to a first antenna in the first target antennas and a second antenna in the second target antennas, and is configured to couple and receive calibration signals, the transmit coupling component is separately connected to a third antenna in the first target antennas and a fourth antenna in the second target antennas, and is configured to transmit and couple calibration signals, a difference value between coupling factors of adjacent antennas in the antenna array is less than a preset value, the memory is configured to store a program and data, and the processor is configured to invoke the program stored in the memory, to perform the following steps:

controlling the first antenna and the second antenna to separately transmit calibration signals, and receiving the calibration signals by using the receive coupling component;

separately determining, based on the calibration signals received by the receive coupling component, the calibration signal transmitted by the first antenna, and the calibration signal transmitted by the second antenna, a calibration compensation value of a transmit channel corresponding to the first antenna and a calibration compensation value of a transmit channel corresponding to the second antenna, and separately performing calibration processing on the transmit channel corresponding to the first antenna and the transmit channel corresponding to the second antenna, so that an amplitude-phase response of the transmit channel corresponding to the first antenna is consistent with an amplitude-phase response of the transmit channel corresponding to the second antenna;

transmitting calibration signals by using the transmit coupling component, and controlling the third antenna and the fourth antenna to separately receive the calibration signals;

separately determining, based on the calibration signals transmitted by the transmit coupling component, the calibration signal received by the third antenna, and the calibration signal received by the fourth antenna, a calibration compensation value of a receive channel corresponding to the third antenna and a calibration compensation value of a receive channel corresponding to the fourth antenna, and separately performing calibration processing on the receive channel corresponding to the third antenna and the receive channel corresponding to the fourth antenna, so that an amplitude-phase response of the receive channel corresponding to the third antenna is consistent with an amplitude-phase response of the receive channel corresponding to the fourth antenna;

when the first target antennas transmit calibration signals, and the second target antennas receive the calibration signals, separately determining, based on a difference value between amplitude-phase responses of transmit channels corresponding to antennas in the first target antennas, calibration compensation values of the transmit channels corresponding to the antennas in the first target antennas, and performing calibration processing on the transmit channels corresponding to the antennas in the first target antennas;

separately determining, based on a difference value between amplitude-phase responses of receive channels corresponding to antennas in the second target antennas, calibration compensation values of the receive channels corresponding to the antennas in the second target antennas, and performing calibration processing on the receive channels corresponding to the antennas in the second target antennas;

when the second target antennas transmit calibration signals, and the first target antennas receive the calibration signals, separately determining, based on a difference value between amplitude-phase responses of transmit channels corresponding to the antennas in the second target antennas, calibration compensation values of the transmit channels corresponding to the antennas in the second target antennas, and performing calibration processing on the transmit channels corresponding to the antennas in the second target antennas, and separately determining, based on a difference value between amplitude-phase responses of receive channels corresponding to the antennas in the first target antennas, calibration compensation values of the receive channels corresponding to the antennas in the first target antennas, and performing calibration processing on the receive channels corresponding to the antennas in the first target antennas.

With reference to the fourth aspect of the embodiment of the present disclosure, in a first possible implementation of the fourth aspect of the embodiment of the present disclosure, a calibration signal transmitted by an antenna in the antenna array is an orthogonal frequency division multiplexing OFDM signal, and subcarriers corresponding to each antenna in the antenna array are divided with a transmission comb comb M in a frequency division manner, where M is greater than or equal to a quantity of antennas included in the antenna array.

With reference to the fourth aspect or the first possible implementation of the fourth aspect of the embodiment of the present disclosure, in a second possible implementation of the fourth aspect of the embodiment of the present disclosure, the first target antennas are odd-numbered antennas in the antenna array, and the second target antennas are even-numbered antennas in the antenna array.

With reference to the fourth aspect or the first possible implementation of the fourth aspect of the embodiment of the present disclosure, in a third possible implementation of the fourth aspect of the embodiment of the present disclosure, the first target antennas are even-numbered antennas in the antenna array, and the second target antennas are odd-numbered antennas in the antenna array.

A fifth aspect of an embodiment of the present disclosure discloses an antenna array calibration apparatus, where an antenna array includes first target antennas and second target antennas, the first antenna dummy element and the fourth antenna dummy element are configured to receive calibration signals, the second antenna dummy element and the third antenna dummy element are configured to transmit calibration signals, an amplitude-phase response of the first antenna dummy element is the same as an amplitude-phase response of the fourth antenna dummy element, an amplitude-phase response of the second antenna dummy element is the same as an amplitude-phase response of the third antenna dummy element, a difference value between coupling factors of adjacent antennas in the antenna array is less than a preset value, and the apparatus includes:

a first calibration unit, configured to: when the first target antennas transmit calibration signals, and the second target antennas receive the calibration signals, separately determine, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and perform calibration processing on the transmit channels corresponding to the antennas in the first target antennas, so that the amplitude-phase responses of the transmit channels corresponding to the antennas in the first target antennas are consistent;

a second calibration unit, configured to separately determine, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and perform calibration processing on the receive channels corresponding to the antennas in the second target antennas, so that the amplitude-phase responses of the receive channels corresponding to the antennas in the second target antennas are consistent;

a third calibration unit, configured to: when the second target antennas transmit calibration signals, and the first target antennas receive the calibration signals, separately determine, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and perform calibration processing on the transmit channels corresponding to the antennas in the second target antennas, so that the amplitude-phase responses of the transmit channels corresponding to the antennas in the second target antennas are consistent; and a fourth calibration unit, configured to separately determine, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and perform calibration processing on the receive channels corresponding to the antennas in the first target antennas, so that the amplitude-phase responses of the receive channels corresponding to the antennas in the first target antennas are consistent.

With reference to the fifth aspect of the embodiment of the present disclosure, in a first possible implementation of the fifth aspect of the embodiment of the present disclosure, a calibration signal transmitted by an antenna in the antenna array is an orthogonal frequency division multiplexing OFDM signal, and subcarriers corresponding to each antenna in the antenna array are divided with a transmission comb comb N in a frequency division manner, where N is greater than or equal to a quantity of antennas included in the antenna array.

With reference to the fifth aspect or the first possible implementation of the fifth aspect of the embodiment of the present disclosure, in a second possible implementation of the fifth aspect of the embodiment of the present disclosure, the first target antennas are odd-numbered antennas in the antenna array, and the second target antennas are even-numbered antennas in the antenna array.

With reference to the fifth aspect or the first possible implementation of the fifth aspect of the embodiment of the present disclosure, in a third possible implementation of the fifth aspect of the embodiment of the present disclosure, the first target antennas are even-numbered antennas in the antenna array, and the second target antennas are odd-numbered antennas in the antenna array.

A sixth aspect of an embodiment of the present disclosure discloses an antenna array calibration apparatus, where an antenna array includes first target antennas and second target antennas, a receive coupling component is added between a first antenna in the first target antennas and a second antenna in the second target antennas, a transmit coupling component is added between a third antenna in the first target antennas and a fourth antenna in the second target antennas, the receive coupling component is configured to couple and receive calibration signals, the transmit coupling component is configured to transmit and couple calibration signals, a difference value between coupling factors of adjacent antennas in the antenna array is less than a preset value, and the apparatus includes:

a first control unit, configured to control the first antenna and the second antenna to separately transmit calibration signals, and receive the calibration signals by using the receive coupling component;

a first calibration unit, configured to separately determine, based on the calibration signals received by the receive coupling component, the calibration signal transmitted by the first antenna, and the calibration signal transmitted by the second antenna, a calibration compensation value of a transmit channel corresponding to the first antenna and a calibration compensation value of a transmit channel corresponding to the second antenna, and separately perform calibration processing on the transmit channel corresponding to the first antenna and the transmit channel corresponding to the second antenna, so that an amplitude-phase response of the transmit channel corresponding to the first antenna is consistent with an amplitude-phase response of the transmit channel corresponding to the second antenna;

a second control unit, configured to transmit calibration signals by using the transmit coupling component, and control the third antenna and the fourth antenna to separately receive the calibration signals;

a second calibration unit, configured to separately determine, based on the calibration signals transmitted by the transmit coupling component, the calibration signal received by the third antenna, and the calibration signal received by the fourth antenna, a calibration compensation value of a receive channel corresponding to the third antenna and a calibration compensation value of a receive channel corresponding to the fourth antenna, and separately perform calibration processing on the receive channel corresponding to the third antenna and the receive channel corresponding to the fourth antenna, so that an amplitude-phase response of the receive channel corresponding to the third antenna is consistent with an amplitude-phase response of the receive channel corresponding to the fourth antenna;

a third calibration unit, configured to: when the first target antennas transmit calibration signals, and the second target antennas receive the calibration signals, separately determine, based on a difference value between amplitude-phase responses of transmit channels corresponding to antennas in the first target antennas, calibration compensation values of the transmit channels corresponding to the antennas in the first target antennas, and perform calibration processing on the transmit channels corresponding to the antennas in the first target antennas; and separately determine, based on a difference value between amplitude-phase responses of receive channels corresponding to antennas in the second target antennas, calibration compensation values of the receive channels corresponding to the antennas in the second target antennas, and perform calibration processing on the receive channels corresponding to the antennas in the second target antennas;

a fourth calibration unit, configured to: when the second target antennas transmit calibration signals, and the first target antennas receive the calibration signals, separately determine, based on a difference value between amplitude-phase responses of transmit channels corresponding to the antennas in the second target antennas, calibration compensation values of the transmit channels corresponding to the antennas in the second target antennas, and perform calibration processing on the transmit channels corresponding to the antennas in the second target antennas; and separately determine, based on a difference value between amplitude-phase responses of receive channels corresponding to the antennas in the first target antennas, calibration compensation values of the receive channels corresponding to the antennas in the first target antennas, and perform calibration processing on the receive channels corresponding to the antennas in the first target antennas.

With reference to the sixth aspect of the embodiment of the present disclosure, in a first possible implementation of the sixth aspect of the embodiment of the present disclosure, a calibration signal transmitted by an antenna in the antenna array is an orthogonal frequency division multiplexing OFDM signal, and subcarriers corresponding to each antenna in the antenna array are divided with a transmission comb comb M in a frequency division manner, where M is greater than or equal to a quantity of antennas included in the antenna array.

With reference to the sixth aspect or the first possible implementation of the sixth aspect of the embodiment of the present disclosure, in a second possible implementation of the sixth aspect of the embodiment of the present disclosure, the first target antennas are odd-numbered antennas in the antenna array, and the second target antennas are even-numbered antennas in the antenna array.

With reference to the sixth aspect or the first possible implementation of the sixth aspect of the embodiment of the present disclosure, in a third possible implementation of the sixth aspect of the embodiment of the present disclosure, the first target antennas are even-numbered antennas in the antenna array, and the second target antennas are odd-numbered antennas in the antenna array.

In the embodiments of the present disclosure, in an antenna array design process, it needs to be ensured that coupling factors of the antenna array are similar, and consistency of coupling factors of adjacent antennas in the antenna array can be further ensured by adding an antenna dummy element in the antenna array, thereby implementing consistency calibration on the antenna array by using the antenna air interface coupling feature.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

FIG. 1 is a schematic flowchart of an antenna array calibration method according to an embodiment of the present disclosure;

FIG. 6A and FIG. 6B are a schematic flowchart of another antenna array calibration method according to an embodiment of the present disclosure;

DETAILED DESCRIPTION

Figure 2:
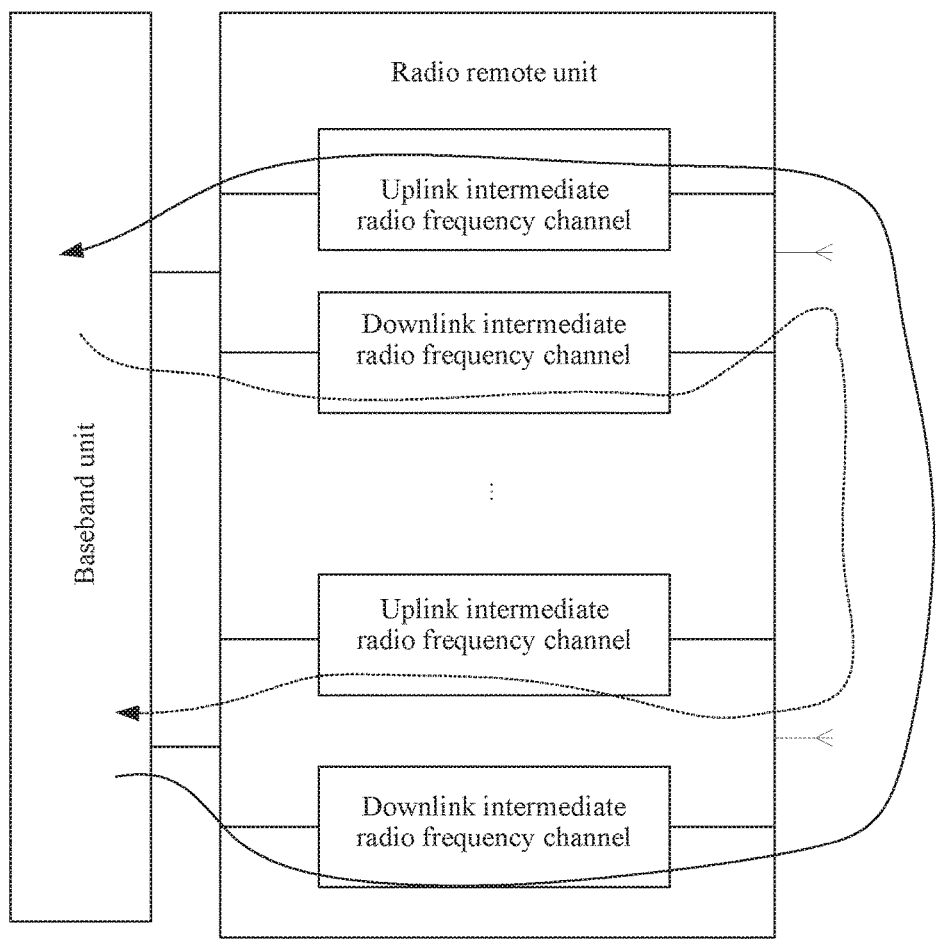
FIG. 2 is an operating principle diagram of a base station device according to an embodiment of the present disclosure.

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose an antenna array calibration method and apparatus, so as to implement consistency calibration in an antenna array by using an antenna air interface coupling feature. The following provides detailed descriptions separately.

Referring to FIG. 1, FIG. 1 is a schematic flowchart of an antenna array calibration method according to an embodiment of the present disclosure. The antenna array calibration method may be applied to a massive MIMO wireless communications system or a radar communications system, so as to implement consistency calibration in an antenna array. The antenna array may include first target antennas and second target antennas, a first antenna dummy element and a second antenna dummy element are added on one end of the antenna array, and a third antenna dummy element and a fourth antenna dummy element are added on the other end of the antenna array. The first antenna dummy element and the fourth antenna dummy element may be configured to receive calibration signals, and the second antenna dummy element and the third antenna dummy element may be configured to transmit calibration signals. An amplitude-phase response of the first antenna dummy element is the same as an amplitude-phase response of the fourth antenna dummy element, and an amplitude-phase response of the second antenna dummy element is the same as an amplitude-phase response of the third antenna dummy element. A difference value between coupling factors of adjacent antennas in the antenna array is less than a preset value. As shown in FIG. 1, the antenna array calibration method may include the following steps.

101. When the first target antennas in the antenna array transmit calibration signals, and the second target antennas in the antenna array receive the calibration signals, separately determine, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and perform calibration processing on the transmit channels corresponding to the antennas in the first target antennas.

In this embodiment of the present disclosure, an antenna array calibration apparatus may first control the transmit channels corresponding to the antennas in the first target antennas of the antenna array to be enabled, to transmit calibration signals, and control receive channels corresponding to antennas in the second target antennas of the antenna array to be enabled, to receive the calibration signals; separately calculate, based on the difference value between each of the amplitude-phase responses of the transmit channels corresponding to the antennas in the first target antennas and the amplitude-phase response of the third antenna dummy element or the second antenna dummy element, the calibration compensation values of the transmit channels corresponding to the antennas in the first target antennas; and separately perform calibration processing on the corresponding transmit channels by using the obtained calibration compensation values of the transmit channels corresponding to the antennas in the first target antennas, so that the amplitude-phase responses of the transmit channels corresponding to the antennas in the first target antennas are consistent. The amplitude-phase response in this embodiment of the present disclosure may also be considered as an amplitude-phase gain.

In this embodiment of the present disclosure, an antenna dummy element is separately added on both ends of the antenna array to serve as a reference channel. The first antenna dummy element may be connected to the fourth antenna dummy element, and the second antenna dummy element may be connected to the third antenna dummy element. A hardware design may be used to ensure that amplitude-phase responses of connected antenna dummy elements are consistent. In other words, the amplitude-phase response of the first antenna dummy element is consistent with the amplitude-phase response of the fourth antenna dummy element, and the amplitude-phase response of the second antenna dummy element is consistent with the amplitude-phase response of the third antenna dummy element.

In this embodiment of the present disclosure, the difference value between coupling factors of adjacent antennas in the antenna array is less than the preset value, and the preset value is extremely small and may be approximately 0, so that the coupling factors of the adjacent antennas are approximately the same. Adding an antenna dummy element on both ends of the antenna array can further reduce the difference value between coupling factors of adjacent antennas.

In this embodiment of the present disclosure, the antenna array calibration apparatus may be a base station device. Referring to FIG. 2, FIG. 2 is an operating principle diagram of a base station device according to an embodiment of the present disclosure. As shown in FIG. 2, the base station device may include at least a baseband unit (BBU) and a radio remote unit (RRU). The baseband unit transmits a baseband signal through a downlink intermediate radio frequency channel by using an antenna, and an air interface signal may be received by using an antenna and transmitted to the baseband unit through an uplink intermediate radio frequency channel for signal processing. Herein, the downlink intermediate radio frequency channel may be considered as a transmit channel corresponding to an antenna, and the uplink intermediate radio frequency channel may be considered as a receive channel corresponding to the antenna. Each antenna may be corresponding to a transmit channel and a receive channel. When a signal needs to be sent, a corresponding transmit channel is enabled; and when a signal needs to be received, a corresponding receive channel is enabled.

In this embodiment of the present disclosure, the difference value between each of the amplitude-phase responses of the transmit channels corresponding to the antennas in the first target antennas and the amplitude-phase response of the third antenna dummy element may be a ratio of amplitude-phase responses of transmit channels of adjacent antennas in the first target antennas and a ratio of the amplitude-phase response of the third antenna dummy element to an amplitude-phase response of a transmit channel corresponding to an antenna adjacent to the third antenna dummy element in the first target antennas. The calibration compensation values of the transmit channels corresponding to the antennas in the first target antennas may be calculated based on the foregoing ratios.

102. Separately determine, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and perform calibration processing on the receive channels corresponding to the antennas in the second target antennas.

In this embodiment of the present disclosure, when the first target antennas transmit calibration signals, and the second target antennas receive the calibration signals, the calibration compensation values of the receive channels corresponding to the antennas in the second target antennas may be separately calculated based on the difference value between each of the amplitude-phase responses of the receive channels corresponding to the antennas in the second target antennas and the amplitude-phase response of the fourth antenna dummy element or the first antenna dummy element; and calibration processing is separately performed on the corresponding receive channels by using the obtained calibration compensation values of the receive channels corresponding to the antennas in the second target antennas, so that the amplitude-phase responses of the receive channels corresponding to the antennas in the second target antennas are consistent.

In this embodiment of the present disclosure, the difference value between each of the amplitude-phase responses of the receive channels corresponding to the antennas in the second target antennas and the amplitude-phase response of the fourth antenna dummy element may be a ratio of amplitude-phase responses of receive channels of adjacent antennas in the second target antennas and a ratio of the amplitude-phase response of the fourth antenna dummy element to an amplitude-phase response of a receive channel corresponding to an antenna adjacent to the fourth antenna dummy element in the second target antennas. The calibration compensation values of the receive channels corresponding to the antennas in the second target antennas may be calculated based on the foregoing ratios.

It may be understood that step 101 may be performed before step 102, or may be performed after step 102, or may be performed together with step 102. This is not limited in this embodiment of the present disclosure.

103. When the second target antennas transmit calibration signals, and the first target antennas receive the calibration signals, separately determine, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and perform calibration processing on the transmit channels corresponding to the antennas in the second target antennas.

In this embodiment of the present disclosure, the antenna array calibration apparatus may control the transmit channels corresponding to the antennas in the second target antennas of the antenna array to be enabled, to transmit calibration signals, and control receive channels corresponding to the antennas in the first target antennas of the antenna array to be enabled, to receive the calibration signals, separately calculate, based on the difference value between each of the amplitude-phase responses of the transmit channels corresponding to the antennas in the second target antennas and the amplitude-phase response of the second antenna dummy element or the third antenna dummy element, the calibration compensation values of the transmit channels corresponding to the antennas in the second target antennas; and separately perform calibration processing on the corresponding transmit channels by using the obtained calibration compensation values of the transmit channels corresponding to the antennas in the second target antennas, so that the amplitude-phase responses of the transmit channels corresponding to the antennas in the second target antennas are consistent.

In this embodiment of the present disclosure, the difference value between each of the amplitude-phase responses of the transmit channels corresponding to the antennas in the second target antennas and the amplitude-phase response of the second antenna dummy element may be a ratio of amplitude-phase responses of transmit channels of adjacent antennas in the second target antennas and a ratio of the amplitude-phase response of the second antenna dummy element to an amplitude-phase response of a transmit channel corresponding to an antenna adjacent to the second antenna dummy element in the second target antennas. The calibration compensation values of the transmit channels corresponding to the antennas in the second target antennas may be calculated based on the foregoing ratios.

In this embodiment of the present disclosure, the amplitude-phase responses of the transmit channels corresponding to the antennas in the first target antennas may be made consistent by performing step 101, the amplitude-phase responses of the transmit channels corresponding to the antennas in the second target antennas may be made consistent by performing step 103, and the amplitude-phase response of the second antenna dummy element is the same as the amplitude-phase response of the third antenna. Therefore, it may be concluded that the amplitude-phase responses of the transmit channels corresponding to the antennas in the first target antennas are consistent with the amplitude-phase responses of the transmit channels corresponding to the antennas in the second target antennas. In other words, amplitude-phase responses of transmit channels corresponding to all antennas included in the antenna array are consistent, so as to implement calibration on the transmit channels of all the antennas.

104. Separately determine, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and perform calibration processing on the receive channels corresponding to the antennas in the first target antennas.

In this embodiment of the present disclosure, when the second target antennas transmit calibration signals, and the first target antennas receive the calibration signals, the calibration compensation values of the receive channels corresponding to the antennas in the first target antennas may be separately calculated based on the difference value between each of the amplitude-phase responses of the receive channels corresponding to the antennas in the first target antennas and the amplitude-phase response of the first antenna dummy element or the fourth antenna dummy element; and calibration processing is separately performed on the corresponding receive channels by using the obtained calibration compensation values of the receive channels corresponding to the antennas in the first target antennas, so that the amplitude-phase responses of the receive channels corresponding to the antennas in the first target antennas are consistent.

In this embodiment of the present disclosure, the difference value between each of the amplitude-phase responses of the receive channels corresponding to the antennas in the first target antennas and the amplitude-phase response of the first antenna dummy element may be a ratio of amplitude-phase responses of receive channels of adjacent antennas in the first target antennas and a ratio of the amplitude-phase response of the first antenna dummy element to an amplitude-phase response of a receive channel corresponding to an antenna adjacent to the first antenna dummy element in the first target antennas. The calibration compensation values of the receive channels corresponding to the antennas in the first target antennas may be calculated based on the foregoing ratios.

It may be understood that step 103 may be performed before step 104, or may be performed after step 104, or may be performed together with step 104. This is not limited in this embodiment of the present disclosure.

In this embodiment of the present disclosure, the amplitude-phase responses of the receive channels corresponding to the antennas in the second target antennas may be made consistent by performing step 102, the amplitude-phase responses of the receive channels corresponding to the antennas in the first target antennas may be made consistent by performing step 104, and the amplitude-phase response of the first antenna dummy element is the same as the amplitude-phase response of the fourth antenna. Therefore, it may be concluded that the amplitude-phase responses of the receive channels corresponding to the antennas in the first target antennas are consistent with the amplitude-phase responses of the receive channels corresponding to the antennas in the second target antennas. In other words, amplitude-phase responses of receive channels corresponding to all the antennas included in the antenna array are consistent, so as to implement calibration on the receive channels of all the antennas.

In this embodiment of the present disclosure, the first target antennas may be first controlled to transmit calibration signals, and the second target antennas receive the calibration signals; or the second target antennas may be first controlled to transmit calibration signals, and the first target antennas receive the calibration signals. This is not limited in this embodiment of the present disclosure.

In an optional implementation, a calibration signal transmitted by an antenna in the antenna array may be an OFDM (Orthogonal Frequency Division Multiplexing) signal, and subcarriers corresponding to each antenna in the antenna array are divided with a transmission comb comb N in a frequency division manner, where N may be greater than or equal to a quantity of antennas included in the antenna array.

In this implementation, the OFDM signal is used as a calibration signal source, thereby facilitating broadband signal calibration and compensation in frequency domain. In addition, all channels can be simultaneously calibrated within a time of only a minimum of two OFDM symbols, and a calibration time is short. In addition, it is stipulated that N is greater than or equal to the quantity of antennas included in the antenna array, so as to avoid interference between the antennas in the antenna array. Preferably, N may be the quantity of antennas included in the antenna array, so as to avoid a waste of resources. For example, there are 32 digital channels in total, a channel 1 occupies subcarriers such as a subcarrier 1, a subcarrier 33, and a subcarrier 65, a channel 2 occupies subcarriers such as a subcarrier 2, a subcarrier 34, and a subcarrier 66, . . . , and a channel 32 occupies subcarriers such as a subcarrier 32, a subcarrier 64, and a subcarrier 96, so that no mutual interference occurs.

In an optional implementation, the first target antennas may be odd-numbered antennas in the antenna array, and the second target antennas may be even-numbered antennas in the antenna array.

Figure 3:
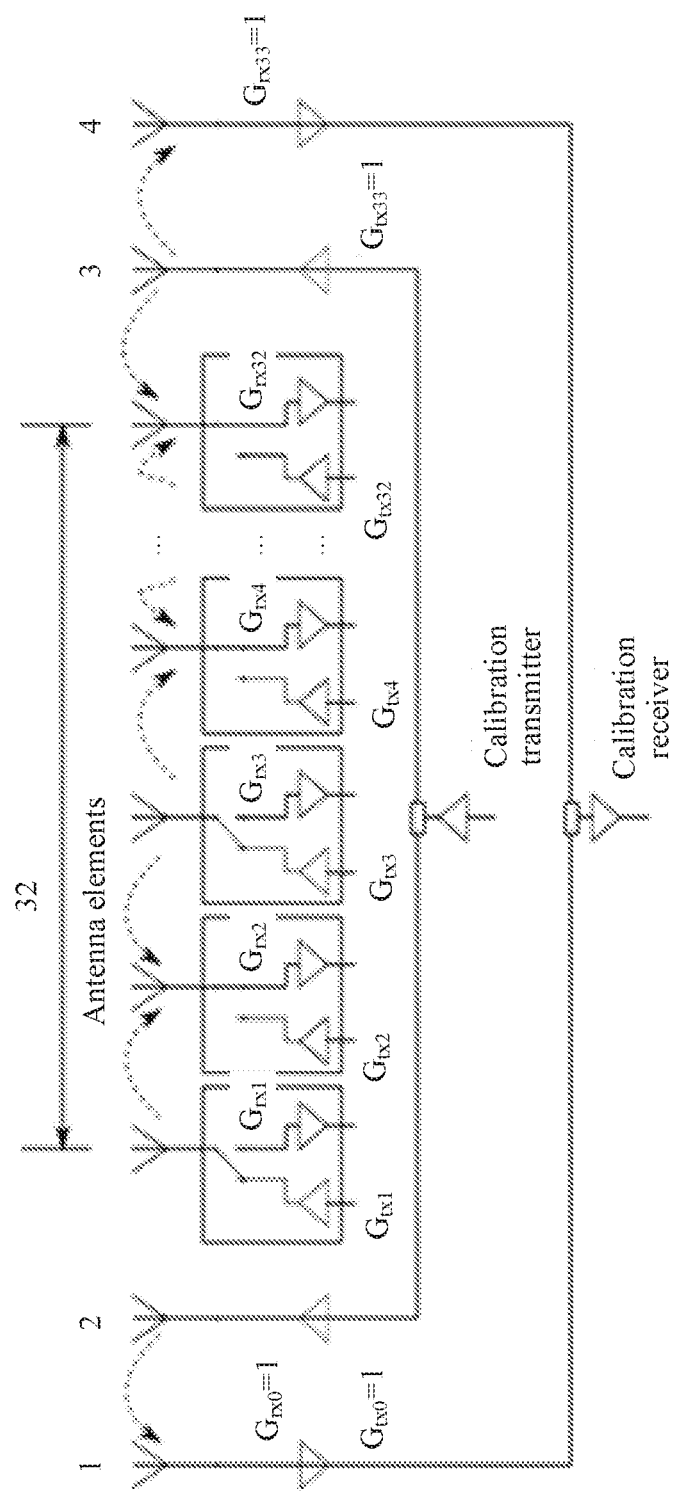
FIG. 3 is a schematic structural diagram of an antenna array according to an embodiment of the present disclosure.

An example in which an antenna array includes 32 antennas is used below for detailed description. Referring to FIG. 3, FIG. 3 is a schematic structural diagram of an antenna array according to an embodiment of the present disclosure. As shown in FIG. 3, the antenna array includes 32 antennas (for example, an antenna 1, an antenna 2, . . . , and an antenna 32), and two antenna dummy elements are added on either end of the antenna array: an antenna dummy element 1 (namely, a first antenna dummy element), an antenna dummy element 2 (namely, a second antenna dummy element), an antenna dummy element 3 (namely, a third antenna dummy element), and an antenna dummy element 4 (namely, a fourth antenna dummy element) shown in the figure. In addition, the antenna dummy element 1 and the antenna dummy element 4 are connected to each other, and are configured to receive calibration signals; and the antenna dummy element 2 and the antenna dummy element 3 are connected to each other, and are configured to transmit calibration signals. Consistency of amplitude-phase responses of antenna dummy elements is ensured through hardware processing: Grx0=Grx33, and Gtx0=Gtx33, where Grx0 is an amplitude-phase response corresponding to a receive channel of the antenna dummy element 1, Grx33 is an amplitude-phase response corresponding to a receive channel of the antenna dummy element 4, Gtx0 is an amplitude-phase response corresponding to a transmit channel of the antenna dummy element 2, and Gtx33 is an amplitude-phase response corresponding to a transmit channel of the antenna dummy element 3. The first target antennas are odd-numbered antennas, namely, the antenna 1, an antenna 3, . . . , an antenna 29, and an antenna 31, and the second target antennas are even-numbered antennas, namely, the antenna 2, an antenna 4, . . . , an antenna 30, and the antenna 32. First, the first target antennas, the antenna dummy element 2, and the antenna dummy element 3 are controlled to transmit calibration signals, and the second target antennas, the antenna dummy element 1, and the antenna dummy element 4 receive the calibration signals. It may be learned, through preset algorithm-based calculation, that Ctx31=Gtx33/Gtx31, Ctx29=Gtx31/Gtx29, . . . , and Ctx1=Gtx3/Gtx1, where Ctxn is a calibration compensation value of a transmit channel of an odd-numbered antenna, Gtxn is an amplitude-phase response corresponding to the transmit channel of the odd-numbered antenna, and n is 1, 3, 5, . . . , or 31 herein. It may be learned that a calibration compensation value of a transmit channel of an odd-numbered antenna is a ratio of an amplitude-phase response corresponding to a transmit channel of an adjacent odd-numbered antenna to an amplitude-phase response corresponding to the transmit channel of the odd-numbered antenna. After calculated calibration compensation values of transmit channels of odd-numbered antennas are used to respectively compensate the transmit channels, amplitude-phase responses of the odd-numbered transmit channels are consistent. In addition, for a receive channel of an even-numbered antenna, Crx32=Grx33/Grx32, Crx30=Grx32/Grx30, . . . , and Crx2=Grx4/Grx2, where Crxn is a calibration compensation value of the receive channel of the even-numbered antenna, Grxn is an amplitude-phase response corresponding to the receive channel of the even-numbered antenna, and n is 2, 4, 6, . . . , or 32 herein. It may be learned that a calibration compensation value of a receive channel of an even-numbered antenna is a ratio of an amplitude-phase response corresponding to a receive channel of an adjacent even-numbered antenna to an amplitude-phase response corresponding to the receive channel of the even-numbered antenna. After calculated calibration compensation values of receive channels of even-numbered antennas are used to respectively compensate the receive channels, amplitude-phase responses of the receive channels of the even-numbered antennas are consistent.

Figure 4:
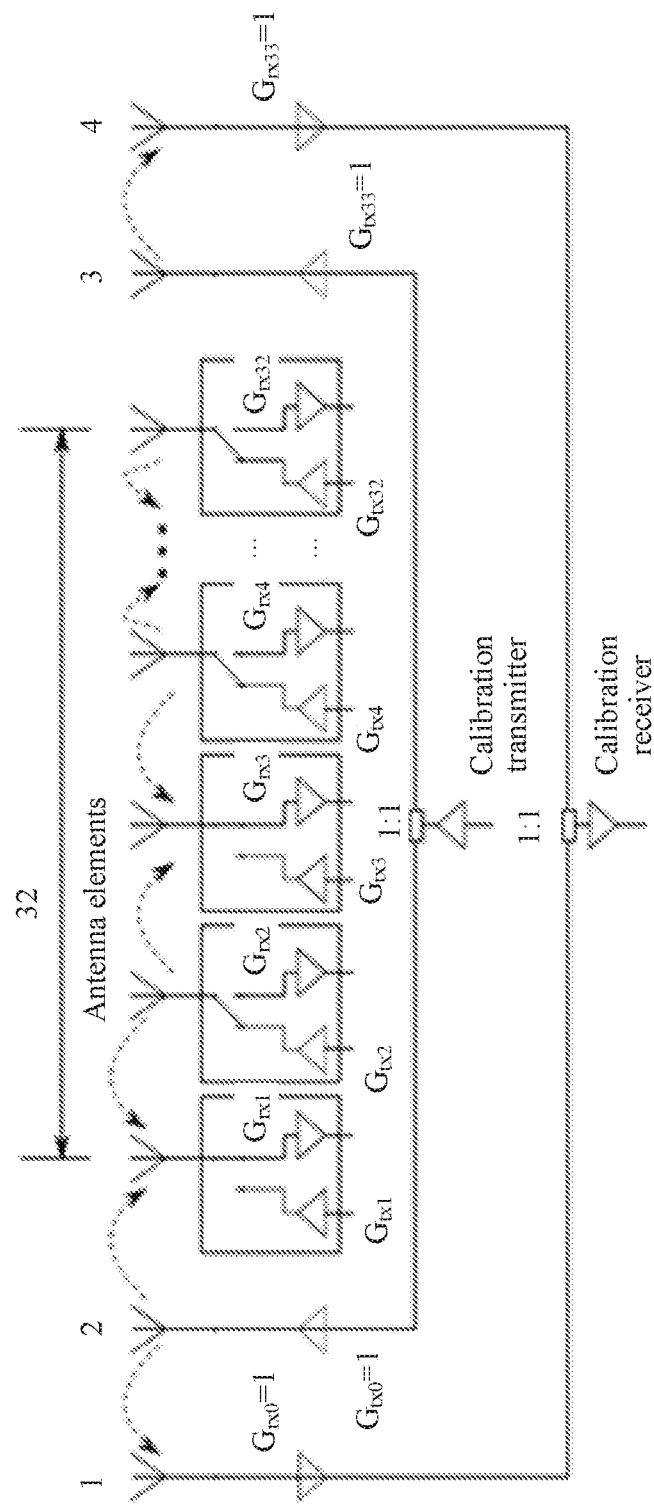
FIG. 4 is a schematic structural diagram of another antenna array according to an embodiment of the present disclosure.

Further, referring to FIG. 4, FIG. 4 is a schematic structural diagram of another antenna array according to an embodiment of the present disclosure. As shown in FIG. 4, the second target antennas, the antenna dummy element 2, and the antenna dummy element 3 are controlled to transmit calibration signals, and the first target antennas, the antenna dummy element 1, and the antenna dummy element 4 receive the calibration signals. It may be learned, through preset algorithm-based calculation, that Ctx2=Gtx0/Gtx2, Ctx4=Gtx2/Gtx4, . . . , and Ctx32=Gtx30/Gtx32, where Ctxn is a calibration compensation value of a transmit channel of an even-numbered antenna, Gtxn is an amplitude-phase response corresponding to the transmit channel of the even-numbered antenna, and n is 2, 4, 6, . . . , or 32 herein. It may be learned that a calibration compensation value of a transmit channel of an even-numbered antenna is a ratio of an amplitude-phase response corresponding to a transmit channel of an adjacent even-numbered antenna to an amplitude-phase response corresponding to the transmit channel of the even-numbered antenna. After calculated calibration compensation values of transmit channels of even-numbered antennas are respectively used to compensate the transmit channels, amplitude-phase responses of the transmit channels of the even-numbered antennas are consistent. In addition, for a receive channel of an odd-numbered antenna, Crx1=Grx0/Grx1, Crx3=Grx1/Grx3, . . . , and Crx31=Grx29/Grx31, where Crxn is a calibration compensation value of the receive channel of the odd-numbered antenna, Grxn is an amplitude-phase response corresponding to the receive channel of the odd-numbered antenna, and n is 1, 3, 5, . . . , or 31 herein. It may be learned that a calibration compensation value of a receive channel of an odd-numbered antenna is a ratio of an amplitude-phase response corresponding to a receive channel of an adjacent odd-numbered antenna to an amplitude-phase response corresponding to the receive channel of the odd-numbered antenna. After calculated calibration compensation values of receive channels of odd-numbered antennas are used to respectively compensate the receive channels, amplitude-phase responses of the receive channels of the odd-numbered antennas are consistent.

During hardware processing of an antenna dummy element, it is ensured that Grx0=Grx33 and Gtx0=Gtx33, so that the amplitude-phase responses of the transmit channels of the odd-numbered antennas are consistent with the amplitude-phase responses of the transmit channels of the even-numbered antennas, and the amplitude-phase responses of the receive channels of the odd-numbered antennas are consistent with the amplitude-phase responses of the receive channels of the even-numbered antennas. In other words, it is ensured that amplitude-phase responses of all transmit channels in the antenna array are consistent, and amplitude-phase responses of all receive channels in the antenna array are consistent, thereby implementing antenna consistency calibration.

Figure 5:
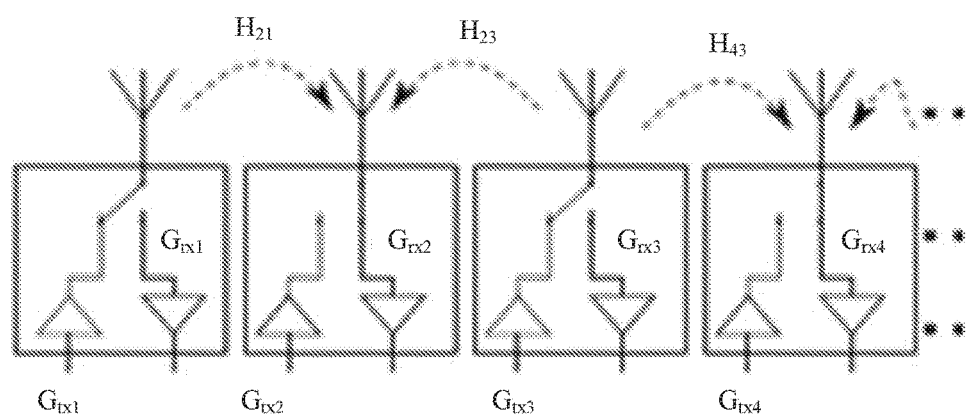
FIG. 5 is a schematic diagram of a process of transmitting a signal between antennas according to an embodiment of the present disclosure.

Specifically, a process of calculating a calibration compensation value of each antenna is further described below by using a calibration compensation value of a transmit channel corresponding to the antenna 1 as an example. Referring to FIG. 5, FIG. 5 is a schematic diagram of a process of transmitting a signal between antennas according to an embodiment of the present disclosure. As shown in FIG. 5, the antenna 1 and the antenna 3 transmit calibration signals, and the antenna 2 and the antenna 4 receive the calibration signals. It is assumed that the calibration signal transmitted by the antenna 1 is Stx1, the calibration signal transmitted by the antenna 3 is Stx3, a calibration signal received by the antenna 2 from the antenna 1 is Srx21, and a calibration signal received by the antenna 2 from the antenna 3 is Srx23. There may be formula 1: Srx21/Stx1=Gtx1*$H_{21}$*Grx2, and formula 2: Srx23/Stx3=Gtx3*$H_{23}$*Grx2, where $H_{21}$ is an amplitude-phase response of a radio channel between the antenna 1 and the antenna 2, and $H_{23}$ is an amplitude-phase response of a radio channel between the antenna 2 and the antenna 3. Because coupling factors of adjacent antennas in the antenna array have a relatively small difference and are approximately the same, $H_{21}$ may be approximately equal to $H_{23}$. It may be learned, by dividing formula 2 by formula 1, that (Srx23/Stx3)/(Srx21/Stx1)=Gtx3/Gtx1. Therefore, it may be learned that Ctx1=Gtx3/Gtx1=(Srx23/Stx3)/(Srx21/Stx1). To be specific, the calibration compensation value of the transmit channel corresponding to the antenna 1 is (Srx23/Stx3)/(Srx21/Stx1). By using the foregoing calculation method, calibration compensation values of all antennas may be successively calculated.

In an optional implementation, the first target antennas may be even-numbered antennas in the antenna array, and the second target antennas may be odd-numbered antennas in the antenna array. A specific implementation process is similar to the foregoing process, and reference may be made to the foregoing content. Details are not described herein again.

In this embodiment of the present disclosure, according to the method described in FIG. 1, features of coupling factors of adjacent antennas are ensured by adding an antenna dummy element on both ends of the antenna array, thereby avoiding a calibration error caused by inconsistency of coupling features of adjacent antennas on an array edge. In addition, consistency of amplitude-phase responses of connected antenna dummy elements can be ensured through hardware processing, so that amplitude-phase responses of odd-numbered channels and even-numbered channels may be possibly aligned, thereby implementing consistency calibration on the antenna array, and satisfying reciprocity calibration while ensuring consistency calibration.

Figure 6A:
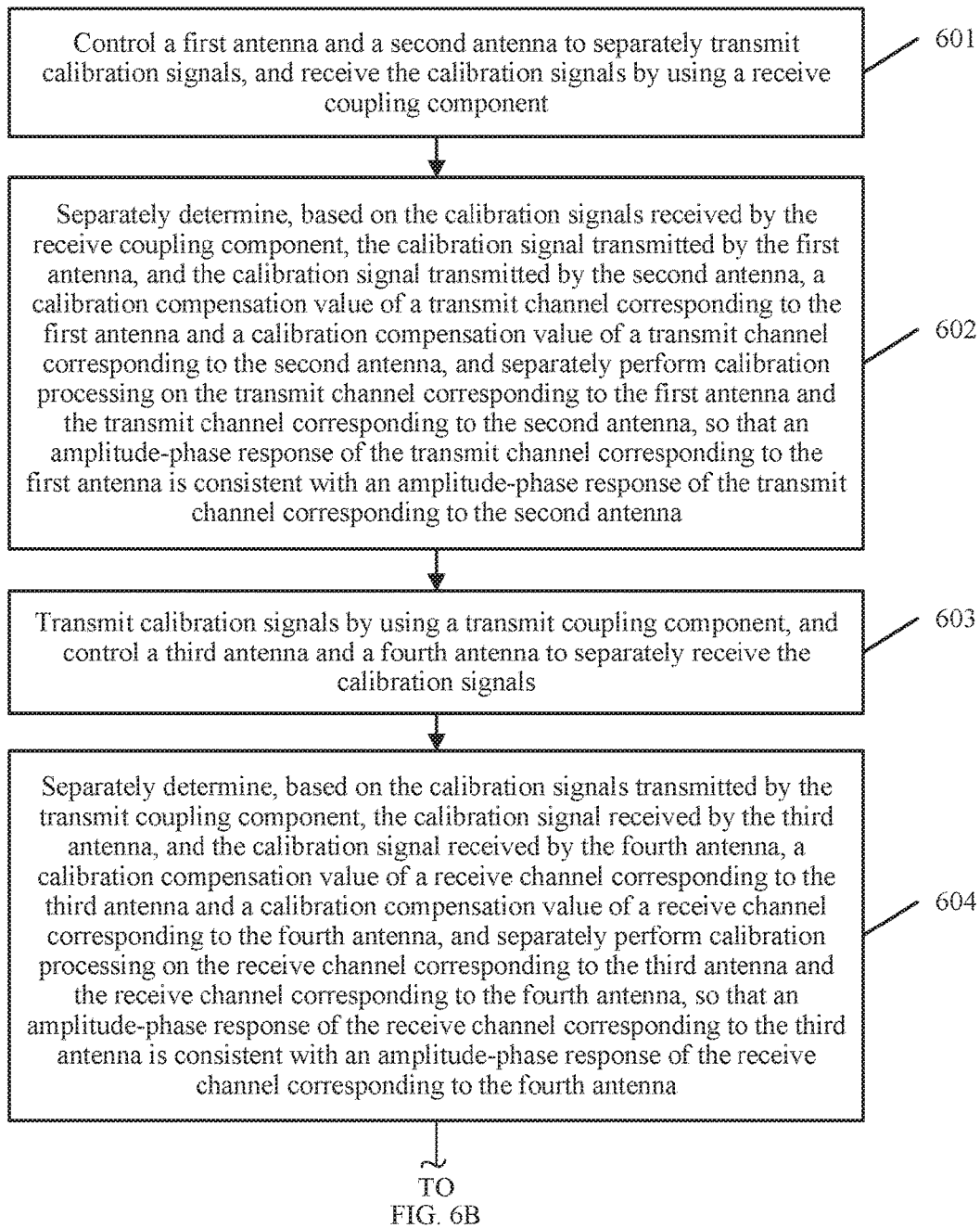

Referring to FIG. 6A and FIG. 6B, FIG. 6A and FIG. 6B are a schematic flowchart of another antenna array calibration method according to an embodiment of the present disclosure. The antenna array calibration method may be applied to a massive MIMO wireless communications system or a radar communications system, so as to implement consistency calibration in an antenna array. The antenna array may include first target antennas and second target antennas. A receive coupling component is added between a first antenna in the first target antennas and a second antenna in the second target antennas, and a transmit coupling component is added between a third antenna in the first target antennas and a fourth antenna in the second target antennas. The receive coupling component may be configured to couple and receive calibration signals, and the transmit coupling component may be configured to transmit and couple calibration signals. A difference value between coupling factors of adjacent antennas in the antenna array is less than a preset value. As shown in FIG. 6A and FIG. 6B, the antenna array calibration method may include the following steps.

601. Control the first antenna and the second antenna to separately transmit calibration signals, and receive the calibration signals by using the receive coupling component.

602. Separately determine, based on the calibration signals received by the receive coupling component, the calibration signal transmitted by the first antenna, and the calibration signal transmitted by the second antenna, a calibration compensation value of a transmit channel corresponding to the first antenna and a calibration compensation value of a transmit channel corresponding to the second antenna, and separately perform calibration processing on the transmit channel corresponding to the first antenna and the transmit channel corresponding to the second antenna, so that an amplitude-phase response of the transmit channel corresponding to the first antenna is consistent with an amplitude-phase response of the transmit channel corresponding to the second antenna.

In this embodiment of the present disclosure, an antenna array calibration apparatus may control the transmit channel corresponding to the first antenna in the first target antennas and the transmit channel corresponding to the second antenna in the second target antennas to be enabled, to transmit calibration signals; and couple and receive, by using the receive coupling component connected to the first antenna and the second antenna, the calibration signals transmitted by the first antenna and the second antenna. The calibration compensation value of the transmit channel of the first antenna and the calibration compensation value of the transmit channel of the second antenna may be calculated based on the calibration signals received by the receive coupling component, the calibration signal transmitted by the first antenna, and the calibration signal transmitted by the second antenna. After the transmit channel of the first antenna is compensated by using the calibration compensation value of the transmit channel of the first antenna, and the transmit channel of the second antenna is compensated by using the calibration compensation value of the transmit channel of the second antenna, the amplitude-phase response of the transmit channel corresponding to the first antenna may be consistent with the amplitude-phase response of the transmit channel corresponding to the second antenna.

In this embodiment of the present disclosure, the difference value between coupling factors of adjacent antennas in the antenna array is less than the preset value, and the preset value is extremely small and may be approximately 0, so that the coupling factors of the adjacent antennas are approximately the same.

603. Transmit calibration signals by using the transmit coupling component, and control the third antenna and the fourth antenna to separately receive the calibration signals.

604. Separately determine, based on the calibration signals transmitted by the transmit coupling component, the calibration signal received by the third antenna, and the calibration signal received by the fourth antenna, a calibration compensation value of a receive channel corresponding to the third antenna and a calibration compensation value of a receive channel corresponding to the fourth antenna, and separately perform calibration processing on the receive channel corresponding to the third antenna and the receive channel corresponding to the fourth antenna, so that an amplitude-phase response of the receive channel corresponding to the third antenna is consistent with an amplitude-phase response of the receive channel corresponding to the fourth antenna.

In this embodiment of the present disclosure, the antenna array calibration apparatus may transmit the calibration signals by using the transmit coupling component connected between the third antenna in the first target antennas and the fourth antenna in the second target antennas; couple the calibration signals to the receive channel of the third antenna and the receive channel of the fourth antenna; and control the receive channel corresponding to the third antenna and the receive channel corresponding to the fourth antenna to be enabled, to receive the calibration signals. The calibration compensation value of the receive channel of the third antenna and the calibration compensation value of the receive channel of the fourth antenna may be calculated based on the calibration signals transmitted by the transmit coupling component, the calibration signal received by the third antenna, and the calibration signal received by the fourth antenna. After the receive channel of the third antenna is compensated by using the calibration compensation value of the receive channel of the third antenna, and the receive channel of the fourth antenna is compensated by using the calibration compensation value of the receive channel of the fourth antenna, the amplitude-phase response of the receive channel corresponding to the third antenna may be consistent with the amplitude-phase response of the receive channel corresponding to the fourth antenna.

It may be understood that step 601 and step 602 may be performed before step 603 and step 604, or may be performed after step 603 and step 604, or step 601, step 602, step 603, and step 604 may be performed simultaneously or alternately. This is not limited in this embodiment of the present disclosure.

605. When the first target antennas transmit calibration signals, and the second target antennas receive the calibration signals, separately determine, based on a difference value between amplitude-phase responses of transmit channels corresponding to antennas in the first target antennas, calibration compensation values of the transmit channels corresponding to the antennas in the first target antennas, perform calibration processing on the transmit channels corresponding to the antennas in the first target antennas, separately determine, based on a difference value between amplitude-phase responses of receive channels corresponding to antennas in the second target antennas, calibration compensation values of the receive channels corresponding to the antennas in the second target antennas, and perform calibration processing on the receive channels corresponding to the antennas in the second target antennas.

In this embodiment of the present disclosure, the antenna array calibration apparatus may control the transmit channels of the antennas in the first target antennas to be enabled, to transmit calibration signals; and control the receive channels corresponding to the antennas in the second target antennas to be enabled, to receive the calibration signals. The calibration compensation values of the transmit channels of the antennas in the first target antennas may be determined based on the difference value between the amplitude-phase responses of the transmit channels of the antennas in the first target antennas. The calibration compensation values of the receive channels of the antennas in the second target antennas may be determined based on the difference value between the amplitude-phase responses of the receive channels of the antennas in the second target antennas. The corresponding transmit channels are compensated by using the calibration compensation values of the transmit channels of the antennas in the first target antennas, so that the amplitude-phase responses of the transmit channels of the antennas in the first target antennas are consistent. The corresponding receive channels are compensated by using the calibration compensation values of the receive channels of the antennas in the second target antennas, so that the amplitude-phase responses of the receive channels of the antennas in the second target antennas are consistent.

In this embodiment of the present disclosure, the difference value between the amplitude-phase responses of the transmit channels corresponding to the antennas in the first target antennas may be a ratio of amplitude-phase responses of transmit channels of adjacent antennas in the first target antennas. The calibration compensation values of the transmit channels corresponding to the antennas in the first target antennas may be calculated based on the ratio of the amplitude-phase responses of the transmit channels between the adjacent antennas in the first target antennas. The difference value between the amplitude-phase responses of the receive channels corresponding to the antennas in the second target antennas may be a ratio of amplitude-phase responses of receive channels of adjacent antennas in the second target antennas. The calibration compensation values of the receive channels corresponding to the antennas in the second target antennas may be calculated based on the ratio of the amplitude-phase responses of the receive channels between the adjacent antennas in the second target antennas.

606. When the second target antennas transmit calibration signals, and the first target antennas receive the calibration signals, separately determine, based on a difference value between amplitude-phase responses of transmit channels corresponding to the antennas in the second target antennas, calibration compensation values of the transmit channels corresponding to the antennas in the second target antennas, perform calibration processing on the transmit channels corresponding to the antennas in the second target antennas, separately determine, based on a difference value between amplitude-phase responses of receive channels corresponding to the antennas in the first target antennas, calibration compensation values of the receive channels corresponding to the antennas in the first target antennas, and perform calibration processing on the receive channels corresponding to the antennas in the first target antennas.

In this embodiment of the present disclosure, the antenna array calibration apparatus may control the transmit channels of the antennas in the second target antennas to be enabled, to transmit calibration signals; and control the receive channels corresponding to the antennas in the first target antennas to be enabled, to receive the calibration signals. The antenna array calibration apparatus may determine the calibration compensation values of the transmit channels of the antennas in the second target antennas based on the difference value between the amplitude-phase responses of the transmit channels of the antennas in the second target antennas; determine the calibration compensation values of the receive channels of the antennas in the first target antennas based on the difference value between the amplitude-phase responses of the receive channels of the antennas in the first target antennas; compensate the corresponding transmit channels by using the calibration compensation values of the transmit channels of the antennas in the second target antennas, so that the amplitude-phase responses of the transmit channels of the antennas in the second target antennas are consistent; and compensate the corresponding receive channels by using the calibration compensation values of the receive channels of the antennas in the first target antennas, so that the amplitude-phase responses of the receive channels of the antennas in the first target antennas are consistent.

In this embodiment of the present disclosure, the difference value between the amplitude-phase responses of the transmit channels corresponding to the antennas in the second target antennas may be a ratio of amplitude-phase responses of transmit channels of adjacent antennas in the second target antennas. The calibration compensation values of the transmit channels corresponding to the antennas in the second target antennas may be calculated based on the ratio of the amplitude-phase responses of the transmit channels between the adjacent antennas in the second target antennas. The difference value between the amplitude-phase responses of the receive channels corresponding to the antennas in the first target antennas may be a ratio of amplitude-phase responses of receive channels of adjacent antennas in the first target antennas. The calibration compensation values of the receive channels corresponding to the antennas in the first target antennas may be calculated based on the ratio of the amplitude-phase responses of the receive channels between the adjacent antennas in the first target antennas.

In this embodiment of the present disclosure, the first target antennas may be first controlled to transmit calibration signals, and the second target antennas receive the calibration signals, or the second target antennas may be first controlled to transmit calibration signals, and the first target antennas receive the calibration signals. This is not limited in this embodiment of the present disclosure.

In an optional implementation, a calibration signal transmitted by an antenna in the antenna array may be an OFDM signal, and subcarriers corresponding to each antenna in the antenna array are divided with a transmission comb comb M in a frequency division manner, where M may be greater than or equal to a quantity of antennas included in the antenna array.

The OFDM signal is used as a calibration signal source, thereby facilitating broadband signal calibration and compensation in frequency domain. M is greater than or equal to the quantity of antennas included in the antenna array, so as to avoid interference between the antennas in the antenna array. Preferably, M may be the quantity of antennas included in the antenna array, so as to avoid a waste of resources.

In an optional implementation, the first target antennas may be odd-numbered antennas in the antenna array, and the second target antennas may be even-numbered antennas in the antenna array.

In an optional implementation, the first target antennas may be even-numbered antennas in the antenna array, and the second target antennas may be odd-numbered antennas in the antenna array.

Figure 7:
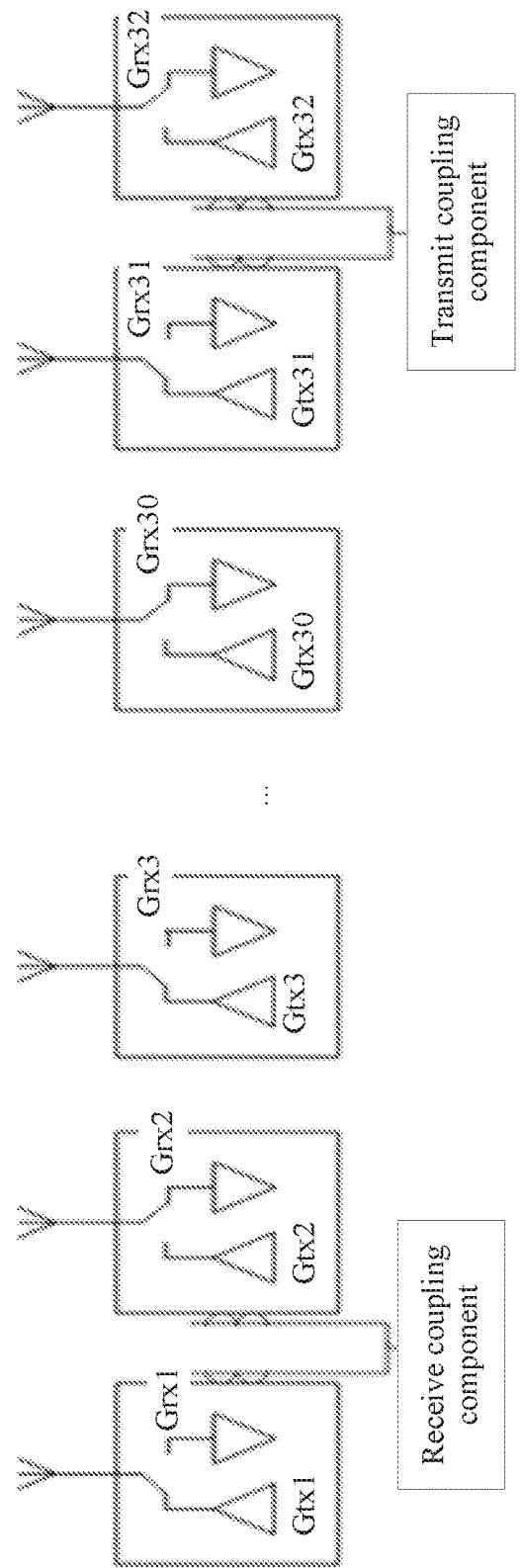
FIG. 7 is a schematic structural diagram of still another antenna array according to an embodiment of the present disclosure.

An example in which an antenna array includes 32 antennas is used below for detailed description. Referring to FIG. 7, FIG. 7 is a schematic structural diagram of still another antenna array according to an embodiment of the present disclosure. As shown in FIG. 7, the antenna array includes 32 antennas (for example, an antenna 1, an antenna 2, . . . , and an antenna 32). It is assumed that the first target antennas are odd-numbered antennas, namely, the antenna 1, an antenna 3, . . . , and an antenna 31, and the second target antennas are even-numbered antennas, namely, the antenna 2, an antenna 4, . . . , and the antenna 32. In addition, a receive coupling component is added between the antenna 1 (namely, a first antenna) and the antenna 2 (namely, a second antenna), and is configured to couple and receive calibration signals. A transmit coupling component is added between the antenna 31 (namely, a third antenna) and the antenna 32 (namely, a fourth antenna), and is configured to transmit and couple calibration signals. When a calibration signal transmitted by the antenna 1 is Stx1, a calibration signal transmitted by the antenna 2 is Stx2, a calibration signal received by the receive coupling component from the antenna 1 is Srx01, and a calibration signal received by the receive coupling component from the antenna 2 is Srx02, there may be formula 1: Srx01/Stx1=Gtx1*$H_{01}$*Grx0, and formula 2: Srx02/Stx2=Gtx2*$H_{02}$*Grx0, where Gtx1 and Gtx2 are respectively an amplitude-phase response of a transmit channel of the antenna 1 and an amplitude-phase response of a transmit channel of the antenna 2, Hot is an amplitude-phase response of a communication channel between the antenna 1 and the receive coupling component, and $H_{02}$ is an amplitude-phase response of a communication channel between the antenna 2 and the receive coupling component. Because Hot and $H_{02}$ of the receive coupling component may be obtained by making a delivery measurement table, that is, because $H_{01}$ and $H_{02}$ may be known, Grx0 is an amplitude-phase response of a receive channel of the receive coupling component. After formula 1 is divided by formula 2, it may be learned, through calculation, that a difference value between the amplitude-phase response of the transmit channel of the antenna 1 and the amplitude-phase response of the transmit channel of the antenna 2 is Gtx1/Gtx2= (Srx01/Stx1)/(Srx02/Stx2)*$H_{02}$/$H_{01}$. Therefore, it may be concluded that a calibration compensation value of the transmit channel of the antenna 1 is 1, and a calibration compensation value of the transmit channel of the antenna 2 is Gtx1/Gtx2. The transmit channel of the antenna 1 and the transmit channel of the antenna 2 are compensated respectively based on the corresponding calibration compensation values, so that the amplitude-phase response of the transmit channel of the antenna 1 is consistent with the amplitude-phase response of the transmit channel of the antenna 2. Likewise, based on the foregoing calculation process, it may be concluded that an amplitude-phase response of a receive channel of the antenna 31 is consistent with an amplitude-phase response of a receive channel of the antenna 32.

In addition, for calculation of calibration compensation values of transmit channels and calibration compensation values of receive channels of antennas in the first target antennas, and calibration compensation values of receive channels and calibration compensation values of transmit channels of antennas in the second target antennas, refer to the calculation process in the previous embodiment. Details are not described herein again. After the corresponding transmit channels are respectively compensated by using the calculated calibration compensation values of the transmit channels of the antennas in the first target antennas, amplitude-phase responses of the transmit channels of the antennas in the first target antennas may be consistent. After the corresponding receive channels are respectively compensated by using the calculated calibration compensation values of the receive channels of the antennas in the second target antennas, amplitude-phase responses of the receive channels of the antennas in the second target antennas may be consistent. After the corresponding receive channel are respectively compensated by using the calculated calibration compensation values of the receive channels of the antennas in the first target antennas, amplitude-phase responses of the receive channels of the antennas in the first target antennas may be consistent. After the corresponding transmit channels are respectively compensated by using the calculated calibration compensation values of the transmit channels of the antennas in the second target antennas, amplitude-phase responses of the transmit channels of the antennas in the second target antennas may be consistent. The amplitude-phase response of the transmit channel of the antenna 1 is consistent with the amplitude-phase response of the transmit channel of the antenna 2, the antenna 1 belongs to the first target antennas, and the antenna 2 belongs to the second target antennas. Therefore, the amplitude-phase responses of the transmit channels of the antennas in the first target antennas are consistent with the amplitude-phase responses of the transmit channels of the antennas in the second target antennas. In other words, amplitude-phase responses of transmit channels corresponding to all antennas included in the antenna array are consistent. In addition, the amplitude-phase response of the receive channel of the antenna 31 is consistent with the amplitude-phase response of the receive channel of the antenna 32, the antenna 31 belongs to the first target antennas, and the antenna 32 belongs to the second target antennas. Therefore, the amplitude-phase responses of the receive channels of the antennas in the first target antennas are consistent with the amplitude-phase responses of the receive channels of the antennas in the second target antennas. In other words, amplitude-phase responses of receive channels corresponding to all the antennas included in the antenna array are consistent. Based on this, consistency calibration on the antenna array can be implemented.

In this embodiment of the present disclosure, according to the method described in FIG. 6A and FIG. 6B, features of coupling factors of adjacent antennas are ensured by adding a radio frequency coupling component in the antenna array, thereby implementing consistency calibration on the antenna array by using an antenna air interface coupling feature, and satisfying reciprocity calibration while ensuring consistency calibration.

Figure 8:
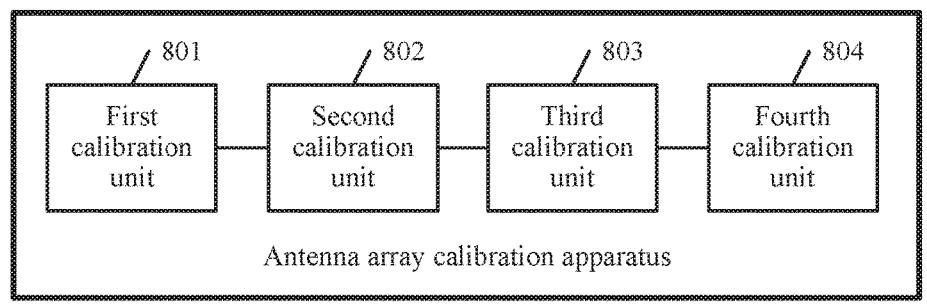
FIG. 8 is a schematic structural diagram of an antenna array calibration apparatus according to an embodiment of the present disclosure.

Referring to FIG. 8, FIG. 8 is a schematic structural diagram of an antenna array calibration apparatus according to an embodiment of the present disclosure. The apparatus may be configured to execute the antenna array calibration methods disclosed in the embodiments of the present disclosure. As shown in FIG. 8, the antenna array calibration apparatus may include a first calibration unit 801, a second calibration unit 802, a third calibration unit 803, and a fourth calibration unit 804.

The first calibration unit 801 is configured to: when first target antennas in an antenna array transmit calibration signals, and second target antennas in the antenna array receive the calibration signals, separately determine, based on a difference value between each of amplitude-phase responses of transmit channels corresponding to antennas in the first target antennas and an amplitude-phase response of a third antenna dummy element, calibration compensation values of the transmit channels corresponding to the antennas in the first target antennas, and perform calibration processing on the transmit channels corresponding to the antennas in the first target antennas, so that the amplitude-phase responses of the transmit channels corresponding to the antennas in the first target antennas are consistent.

In this embodiment of the present disclosure, the antenna array calibrated by the antenna array calibration apparatus may include the first target antennas and the second target antennas, a first antenna dummy element and a second antenna dummy element are added on one end of the antenna array, and the third antenna dummy element and a fourth antenna dummy element are added on the other end of the antenna array. The first antenna dummy element and the fourth antenna dummy element are configured to receive calibration signals, and the second antenna dummy element and the third antenna dummy element are configured to transmit calibration signals. An amplitude-phase response of the first antenna dummy element is the same as an amplitude-phase response of the fourth antenna dummy element, and an amplitude-phase response of the second antenna dummy element is the same as the amplitude-phase response of the third antenna dummy element. In addition, a difference value between coupling factors of adjacent antennas in the antenna array is less than a preset value, and the preset value is extremely small and may be approximately 0, so that the coupling factors of the adjacent antennas are approximately the same. The difference value between the coupling factors of the adjacent antennas can be further reduced by adding an antenna dummy element on both ends of the antenna array.

In this embodiment of the present disclosure, the difference value between each of the amplitude-phase responses of the transmit channels corresponding to the antennas in the first target antennas and the amplitude-phase response of the third antenna dummy element may be a ratio of amplitude-phase responses of transmit channels of adjacent antennas in the first target antennas and a ratio of the amplitude-phase response of the third antenna dummy element to an amplitude-phase response of a transmit channel corresponding to an antenna adjacent to the first antenna dummy element in the first target antennas. The calibration compensation values of the transmit channels corresponding to the antennas in the first target antennas may be calculated based on the foregoing ratios.

The second calibration unit 802 is configured to separately determine, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and perform calibration processing on the receive channels corresponding to the antennas in the second target antennas, so that the amplitude-phase responses of the receive channels corresponding to the antennas in the second target antennas are consistent.

In this embodiment of the present disclosure, the difference value between each of the amplitude-phase responses of the receive channels corresponding to the antennas in the second target antennas and the amplitude-phase response of the fourth antenna dummy element may be a ratio of amplitude-phase responses of receive channels of adjacent antennas in the second target antennas and a ratio of the amplitude-phase response of the fourth antenna dummy element to an amplitude-phase response of a receive channel corresponding to an antenna adjacent to the fourth antenna dummy element in the second target antennas. The calibration compensation values of the receive channels corresponding to the antennas in the second target antennas may be calculated based on the foregoing ratios.

The third calibration unit 803 is configured to: when the second target antennas transmit calibration signals, and the first target antennas receive the calibration signals, separately determine, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and perform calibration processing on the transmit channels corresponding to the antennas in the second target antennas, so that the amplitude-phase responses of the transmit channels corresponding to the antennas in the second target antennas are consistent.

In this embodiment of the present disclosure, the difference value between each of the amplitude-phase responses of the transmit channels corresponding to the antennas in the second target antennas and the amplitude-phase response of the second antenna dummy element may be a ratio of amplitude-phase responses of transmit channels of adjacent antennas in the second target antennas and a ratio of the amplitude-phase response of the second antenna dummy element to an amplitude-phase response of a transmit channel corresponding to an antenna adjacent to the second antenna dummy element in the second target antennas. The calibration compensation values of the transmit channels corresponding to the antennas in the second target antennas may be calculated based on the foregoing ratios.

The fourth calibration unit 804 is configured to separately determine, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and perform calibration processing on the receive channels corresponding to the antennas in the first target antennas, so that the amplitude-phase responses of the receive channels corresponding to the antennas in the first target antennas are consistent.

In this embodiment of the present disclosure, the difference value between each of the amplitude-phase responses of the receive channels corresponding to the antennas in the first target antennas and the amplitude-phase response of the first antenna dummy element may be a ratio of amplitude-phase responses of receive channels of adjacent antennas in the first target antennas and a ratio of the amplitude-phase response of the first antenna dummy element to an amplitude-phase response of a receive channel corresponding to an antenna adjacent to the first antenna dummy element in the first target antennas. The calibration compensation values of the receive channels corresponding to the antennas in the first target antennas may be calculated based on the foregoing ratios.

In this embodiment of the present disclosure, it is ensured that the amplitude-phase responses of the transmit channels corresponding to the antennas in the first target antennas are consistent, the amplitude-phase responses of the transmit channels corresponding to the antennas in the second target antennas are consistent, and the amplitude-phase response of the second antenna dummy element is the same as the amplitude-phase response of the third antenna. Therefore, it may be concluded that the amplitude-phase responses of the transmit channels corresponding to the antennas in the first target antennas are consistent with the amplitude-phase responses of the transmit channels corresponding to the antennas in the second target antennas. In other words, amplitude-phase responses of transmit channels corresponding to all antennas included in the antenna array are consistent, so as to implement calibration on the transmit channels of all the antennas.

In this embodiment of the present disclosure, it is ensured that the amplitude-phase responses of the receive channels corresponding to the antennas in the second target antennas are consistent, the amplitude-phase responses of the receive channels corresponding to the antennas in the first target antennas are consistent, and the amplitude-phase response of the first antenna dummy element is the same as the amplitude-phase response of the fourth antenna. Therefore, it may be concluded that the amplitude-phase responses of the receive channels corresponding to the antennas in the first target antennas are consistent with the amplitude-phase responses of the receive channels corresponding to the antennas in the second target antennas. In other words, amplitude-phase responses of receive channels corresponding to all the antennas included in the antenna array are consistent, so as to implement calibration on the receive channels of all the antennas.

In an optional implementation, a calibration signal transmitted by an antenna in the antenna array may be an OFDM signal, and subcarriers corresponding to each antenna in the antenna array are divided with a transmission comb comb N in a frequency division manner, where N may be greater than or equal to a quantity of antennas included in the antenna array.

In an optional implementation, the first target antennas may be odd-numbered antennas in the antenna array, and the second target antennas may be even-numbered antennas in the antenna array.

In an optional implementation, the first target antennas may be even-numbered antennas in the antenna array, and the second target antennas may be odd-numbered antennas in the antenna array.

In this embodiment of the present disclosure, according to the antenna array calibration apparatus shown in FIG. 8, features of coupling factors of adjacent antennas are ensured by separately adding an antenna dummy element on both ends of the antenna array, thereby avoiding a calibration error caused by inconsistency of coupling features of adjacent antennas in an array edge. In addition, consistency of amplitude-phase responses of connected antenna dummy elements can be ensured through hardware processing, so that amplitude-phase responses of odd-numbered channels and even-numbered channels may be possibly aligned, thereby implementing consistency calibration on the antenna array, and satisfying reciprocity calibration while ensuring consistency calibration.

Figure 9:
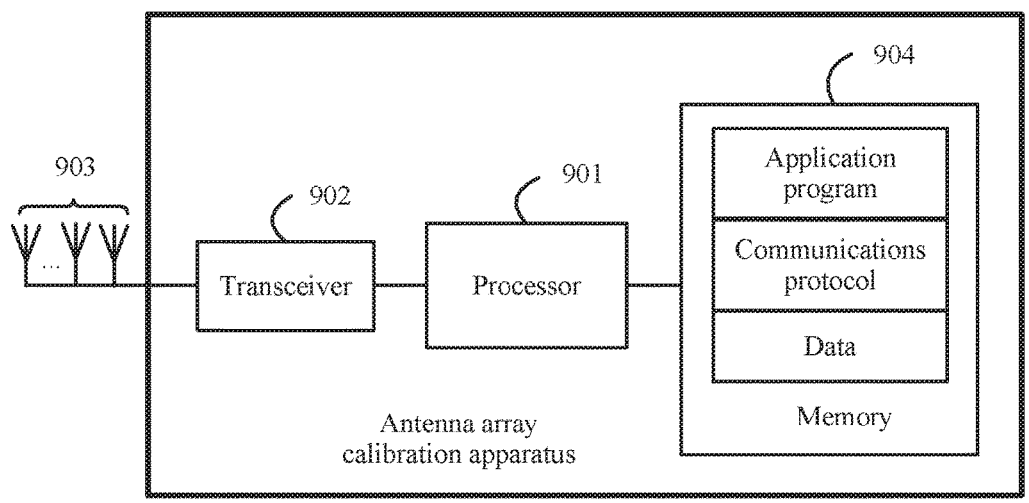
FIG. 9 is a schematic structural diagram of another antenna array calibration apparatus according to an embodiment of the present disclosure.

Referring to FIG. 9, FIG. 9 is a schematic structural diagram of another antenna array calibration apparatus according to an embodiment of the present disclosure. The apparatus may be configured to execute the antenna array calibration methods disclosed in the embodiments of the present disclosure. As shown in FIG. 9, the antenna array calibration apparatus may include components such as at least one processor 901, at least one transceiver 902, an antenna array 903, and a memory 904. A person skilled in the art may understand that a structure of the antenna array calibration apparatus shown in FIG. 9 does not constitute a limitation on this embodiment of the present disclosure. The structure may not only be a bus structure, but may also be a star structure, and may further include more or fewer components than those shown in the figure, or combine some components, or have different component arrangements.

In this embodiment of the present disclosure, the processor 901 is a control center of the antenna array calibration apparatus, and performs various functions of the antenna array calibration apparatus and data processing by running or executing a program and/or a module stored in the memory 904 and invoking data stored in the memory 904. The processor 901 may include an integrated circuit (IC), for example, may include a single packaged IC, or may include a plurality of packaged ICs having a same function or different functions. For example, the processor 901 may be an SOC chip including an application processor, a baseband processor, a digital signal processor (DSP), a graphics processing unit (GPU), and the like; or may be a baseband processor only used for baseband signal processing or an application-specific integrated circuit (ASIC).

In this embodiment of the present disclosure, the transceiver 902 may be configured to receive an air interface signal and transmit a radio frequency signal.

In this embodiment of the present disclosure, the antenna array 903 includes first target antennas and second target antennas. In addition, a first antenna dummy element and a second antenna dummy element (not shown in FIG. 9) are added on one end of the antenna array, and a third antenna dummy element and a fourth antenna dummy element (not shown in FIG. 9) are added on the other end of the antenna array 903. The first antenna dummy element and the fourth antenna dummy element are configured to receive calibration signals, and the second antenna dummy element and the third antenna dummy element are configured to transmit calibration signals. An amplitude-phase response of the first antenna dummy element is the same as an amplitude-phase response of the fourth antenna dummy element, and an amplitude-phase response of the second antenna dummy element is the same as an amplitude-phase response of the third antenna dummy element. A difference value between coupling factors of adjacent antennas in the antenna array 903 is less than a preset value.

In this embodiment of the present disclosure, the memory 904 may be a high-speed RAM memory or a nonvolatile memory, such as at least one magnetic disk storage. Optionally, the memory 904 may be at least one storage apparatus that is far away from the processor 901. As shown in FIG. 9, the memory 904 may include a communications protocol, an application program, data, and the like. This is not limited in this embodiment of the present disclosure.

In the antenna array calibration apparatus shown in FIG. 9, the processor 901 may be configured to invoke the application program stored in the memory 904, to perform the following operations:

when the transceiver 902 is controlled to transmit calibration signals by using the first target antennas in the antenna array 903, and receive the calibration signals by using the second target antennas in the antenna array 903, separately determining, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and performing calibration processing on the transmit channels corresponding to the antennas in the first target antennas;

separately determining, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and performing calibration processing on the receive channels corresponding to the antennas in the second target antennas;

when the transceiver 902 is controlled to transmit calibration signals by using the second target antennas in the antenna array 903, and receive the calibration signals by using the first target antennas in the antenna array 903, separately determining, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and performing calibration processing on the transmit channels corresponding to the antennas in the second target antennas; and separately determining, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and performing calibration processing on the receive channels corresponding to the antennas in the first target antennas.

In an optional implementation, a calibration signal transmitted by an antenna in the antenna array 903 is an orthogonal frequency division multiplexing (OFDM) signal, and subcarriers corresponding to each antenna in the antenna array 903 are divided with a transmission comb comb N in a frequency division manner, where N is greater than or equal to a quantity of antennas included in the antenna array 903.

In an optional implementation, the first target antennas are odd-numbered antennas in the antenna array 903, and the second target antennas are even-numbered antennas in the antenna array 903.

In an optional implementation, the first target antennas are even-numbered antennas in the antenna array 903, and the second target antennas are odd-numbered antennas in the antenna array 903.

Specifically, the antenna array calibration apparatus described in this embodiment of the present disclosure may implement some or all procedures in the embodiment of the antenna array calibration method described in the present disclosure with reference to FIG. 1.

In this embodiment of the present disclosure, according to the antenna array calibration apparatus shown in FIG. 9, features of coupling factors of adjacent antennas are ensured by separately adding an antenna dummy element on both ends of the antenna array, thereby avoiding a calibration error caused by inconsistency of coupling features of adjacent antennas in an array edge. In addition, consistency of amplitude-phase responses of connected antenna dummy elements can be ensured through hardware processing, so that amplitude-phase responses of odd-numbered channels and even-numbered channels may be possibly aligned, thereby implementing consistency calibration on the antenna array, and satisfying reciprocity calibration while ensuring consistency calibration.

Figure 10:
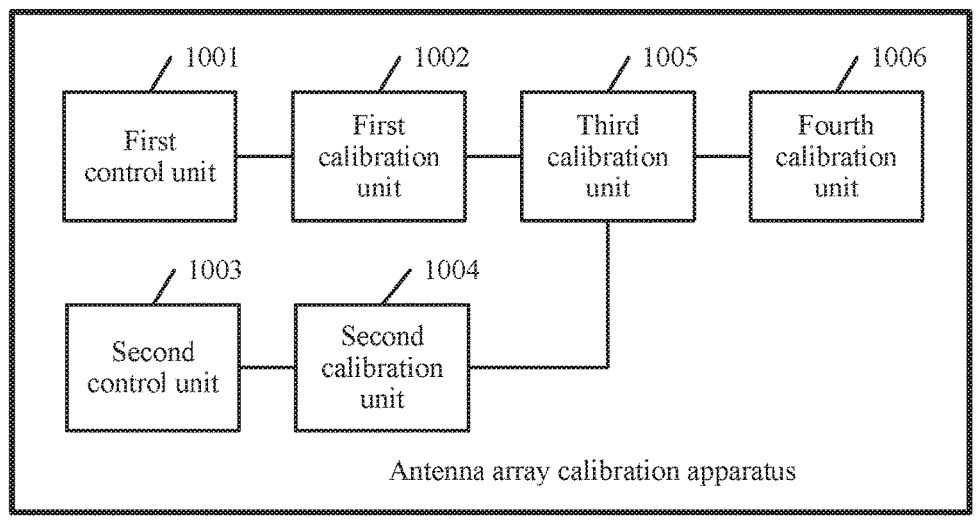
FIG. 10 is a schematic structural diagram of another antenna array calibration apparatus according to an embodiment of the present disclosure.

Referring to FIG. 10, FIG. 10 is a schematic structural diagram of another antenna array calibration apparatus according to an embodiment of the present disclosure. The apparatus may be configured to execute the antenna array calibration methods disclosed in the embodiments of the present disclosure. As shown in FIG. 10, the antenna array calibration apparatus may include a first control unit 1001, a first calibration unit 1002, a second control unit 1003, a second calibration unit 1004, a third calibration unit 1005, and a fourth calibration unit 1006.

The first control unit 1001 is configured to control a first antenna and a second antenna to separately transmit calibration signals, and receive the calibration signals by using a receive coupling component.

The first calibration unit 1002 is configured to separately determine, based on the calibration signals received by the receive coupling component, the calibration signal transmitted by the first antenna, and the calibration signal transmitted by the second antenna, a calibration compensation value of a transmit channel corresponding to the first antenna and a calibration compensation value of a transmit channel corresponding to the second antenna, and separately perform calibration processing on the transmit channel corresponding to the first antenna and the transmit channel corresponding to the second antenna, so that an amplitude-phase response of the transmit channel corresponding to the first antenna is consistent with an amplitude-phase response of the transmit channel corresponding to the second antenna.

The second control unit 1003 is configured to transmit calibration signals by using a transmit coupling component, and control a third antenna and a fourth antenna to separately receive the calibration signals.

The second calibration unit 1004 is configured to separately determine, based on the calibration signals transmitted by the transmit coupling component, the calibration signal received by the third antenna, and the calibration signal received by the fourth antenna, a calibration compensation value of a receive channel corresponding to the third antenna and a calibration compensation value of a receive channel corresponding to the fourth antenna, and separately perform calibration processing on the receive channel corresponding to the third antenna and the receive channel corresponding to the fourth antenna, so that an amplitude-phase response of the receive channel corresponding to the third antenna is consistent with an amplitude-phase response of the receive channel corresponding to the fourth antenna.

In this embodiment of the present disclosure, an antenna array calibrated by the antenna array calibration apparatus may include first target antennas and second target antennas. In addition, a receive coupling component is added between the first antenna in the first target antennas and the second antenna in the second target antennas, and a transmit coupling component is added between the third antenna in the first target antennas and the fourth antenna in the second target antennas. The receive coupling component may be configured to couple and receive the calibration signals transmitted by the first antenna and the second antenna, and the transmit coupling component may be configured to transmit the calibration signals and couple the calibration signals to the receive channel of the third antenna and the receive channel of the fourth antenna. A difference value between coupling factors of adjacent antennas in the antenna array is less than a preset value, and the preset value is extremely small and may be approximately 0, so that the coupling factors of the adjacent antennas are approximately the same.

The third calibration unit 1005 is configured to: when the first target antennas transmit calibration signals, and the second target antennas receive the calibration signals, separately determine, based on a difference value between amplitude-phase responses of transmit channels corresponding to antennas in the first target antennas, calibration compensation values of the transmit channels corresponding to the antennas in the first target antennas, and perform calibration processing on the transmit channels corresponding to the antennas in the first target antennas; and separately determine, based on a difference value between amplitude-phase responses of receive channels corresponding to antennas in the second target antennas, calibration compensation values of the receive channels corresponding to the antennas in the second target antennas, and perform calibration processing on the receive channels corresponding to the antennas in the second target antennas.

The fourth calibration unit 1006 is configured to: when the second target antennas transmit calibration signals, and the first target antennas receive the calibration signals, separately determine, based on a difference value between amplitude-phase responses of transmit channels corresponding to the antennas in the second target antennas, calibration compensation values of the transmit channels corresponding to the antennas in the second target antennas, and perform calibration processing on the transmit channels corresponding to the antennas in the second target antennas; and separately determine, based on a difference value between amplitude-phase responses of receive channels corresponding to the antennas in the first target antennas, calibration compensation values of the receive channels corresponding to the antennas in the first target antennas, and perform calibration processing on the receive channels corresponding to the antennas in the first target antennas.

In this embodiment of the present disclosure, after the third calibration unit 1005 separately performs calibration processing on the corresponding transmit channels by using the calibration compensation values of the transmit channels corresponding to the antennas in the first target antennas, the amplitude-phase responses of the transmit channels corresponding to the antennas in the first target antennas may be consistent. After the third calibration unit 1005 separately performs calibration processing on the corresponding receive channels by using the calibration compensation values of the receive channels corresponding to the antennas in the second target antennas, the amplitude-phase responses of the receive channels corresponding to the antennas in the second target antennas may be consistent.

In this embodiment of the present disclosure, after the fourth calibration unit 1006 separately performs calibration processing on the corresponding transmit channels by using the calibration compensation values of the transmit channels corresponding to the antennas in the second target antennas, the amplitude-phase responses of the transmit channels corresponding to the antennas in the second target antennas may be consistent. After the fourth calibration unit 1006 separately performs calibration processing on the corresponding receive channels by using the calibration compensation values of the receive channels corresponding to the antennas in the first target antennas, the amplitude-phase responses of the receive channels corresponding to the antennas in the first target antennas may be consistent.

In this embodiment of the present disclosure, the first calibration unit 1002 enables the amplitude-phase response of the transmit channel corresponding to the first antenna to be consistent with the amplitude-phase response of the transmit channel corresponding to the second antenna, the first antenna belongs to the first target antennas, and the second antenna belongs to the second target antennas. Therefore, the amplitude-phase responses of the transmit channels corresponding to the antennas in the first target antennas are consistent with the amplitude-phase responses of the transmit channels corresponding to the antennas in the second target antennas. In other words, amplitude-phase responses of transmit channels of all antennas in the antenna array are consistent. In addition, the second calibration unit 1004 enables the amplitude-phase response of the receive channel corresponding to the third antenna to be consistent with the amplitude-phase response of the receive channel corresponding to the fourth antenna, the third antenna belongs to the first target antennas, and the fourth antenna belongs to the second target antennas. Therefore, the amplitude-phase responses of the receive channels corresponding to the antennas in the first target antennas are consistent with the amplitude-phase responses of the receive channels corresponding to the antennas in the second target antennas. Based on this, consistency calibration on the antenna array can be implemented.

In an optional implementation, a calibration signal transmitted by an antenna in the antenna array may be an OFDM signal, and subcarriers corresponding to each antenna in the antenna array are divided with a transmission comb comb M in a frequency division manner, where M may be greater than or equal to a quantity of antennas included in the antenna array.

In an optional implementation, the first target antennas may be odd-numbered antennas in the antenna array, and the second target antennas may be even-numbered antennas in the antenna array.

In an optional implementation, the first target antennas may be even-numbered antennas in the antenna array, and the second target antennas may be odd-numbered antennas in the antenna array.

In this embodiment of the present disclosure, according to the antenna array calibration apparatus shown in FIG. 10, features of coupling factors of adjacent antennas are ensured by adding a radio frequency coupling component in the antenna array, thereby implementing consistency calibration on the antenna array by using an antenna air interface coupling feature, and satisfying reciprocity calibration while ensuring consistency calibration.

Figure 11:
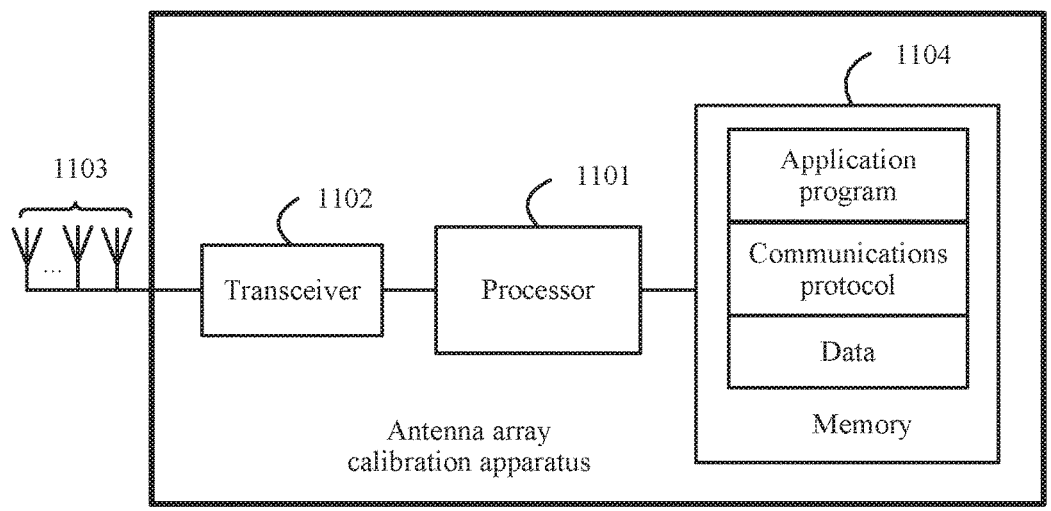
FIG. 11 is a schematic structural diagram of still another antenna array calibration apparatus according to an embodiment of the present disclosure.

Referring to FIG. 11, FIG. 11 is a schematic structural diagram of still another antenna array calibration apparatus according to an embodiment of the present disclosure. The apparatus may be configured to execute the antenna array calibration methods disclosed in the embodiments of the present disclosure. As shown in FIG. 11, the antenna array calibration apparatus may include components such as at least one processor 1101, at least one transceiver 1102, an antenna array 1103, and a memory 1104. A person skilled in the art may understand that a structure of the antenna array calibration apparatus shown in FIG. 11 does not constitute a limitation on this embodiment of the present disclosure. The structure may not only be a bus structure, but may also be a star structure, and may further include more or fewer components than those shown in the figure, or combine some components, or have different component arrangements.

In this embodiment of the present disclosure, the processor 1101 is a control center of the antenna array calibration apparatus, and performs various functions of the antenna array calibration apparatus and data processing by running or executing a program and/or a module stored in the memory 1104 and invoking data stored in the memory 1104. The processor 1101 may include an integrated circuit IC, for example, may include a single packaged IC, or may include a plurality of packaged ICs having a same function or different functions. For example, the processor 1101 may be an SOC chip including an application processor, a baseband processor, a DSP, a GPU, and the like; or may be a baseband processor only used for baseband signal processing or an ASIC.

In this embodiment of the present disclosure, the transceiver 1102 may be configured to receive an air interface signal and transmit a radio frequency signal.

In this embodiment of the present disclosure, the antenna array 1103 includes first target antennas and second target antennas. In addition, a receive coupling component (not shown in FIG. 11) is added between a first antenna in the first target antennas and a second antenna in the second target antennas, and a transmit coupling component (not shown in FIG. 11) is added between a third antenna in the first target antennas and a fourth antenna in the second target antennas. The receive coupling component may be configured to couple and receive calibration signals, and the transmit coupling component may be configured to transmit and couple calibration signals. A difference value between coupling factors of adjacent antennas in the antenna array 1103 is less than a preset value.

In this embodiment of the present disclosure, the memory 1104 may be a high-speed RAM memory or a nonvolatile memory, such as at least one magnetic disk storage. Optionally, the memory 1104 may be at least one storage apparatus that is far away from the processor 1101. As shown in FIG. 11, the memory 1104 may include a communications protocol, an application program, data, and the like. This is not limited in this embodiment of the present disclosure.

In the antenna array calibration apparatus shown in FIG. 11, the processor 1101 may be configured to invoke the application program stored in the memory 1104, to perform the following operations:

controlling the transceiver 1102 to separately transmit calibration signals by using the first antenna and the second antenna in the antenna array 1103, and receive the calibration signals by using the receive coupling component;

separately determining, based on the calibration signals received by the receive coupling component, the calibration signal transmitted by the first antenna, and the calibration signal transmitted by the second antenna, a calibration compensation value of a transmit channel corresponding to the first antenna and a calibration compensation value of a transmit channel corresponding to the second antenna, and separately performing calibration processing on the transmit channel corresponding to the first antenna and the transmit channel corresponding to the second antenna, so that an amplitude-phase response of the transmit channel corresponding to the first antenna is consistent with an amplitude-phase response of the transmit channel corresponding to the second antenna;

transmitting calibration signals by using the transmit coupling component, and controlling the transceiver 1102 to separately receive the calibration signals by using the third antenna and the fourth antenna in the antenna array 1103;

separately determining, based on the calibration signals transmitted by the transmit coupling component, the calibration signal received by the third antenna, and the calibration signal received by the fourth antenna, a calibration compensation value of a receive channel corresponding to the third antenna and a calibration compensation value of a receive channel corresponding to the fourth antenna, and separately performing calibration processing on the receive channel corresponding to the third antenna and the receive channel corresponding to the fourth antenna, so that an amplitude-phase response of the receive channel corresponding to the third antenna is consistent with an amplitude-phase response of the receive channel corresponding to the fourth antenna;

when the transceiver 1102 is controlled to transmit calibration signals by using the first target antennas in the antenna array 1103, and receive the calibration signals by using the second target antennas in the antenna array 1103, separately determining, based on a difference value between amplitude-phase responses of transmit channels corresponding to antennas in the first target antennas, calibration compensation values of the transmit channels corresponding to the antennas in the first target antennas, and performing calibration processing on the transmit channels corresponding to the antennas in the first target antennas;

separately determining, based on a difference value between amplitude-phase responses of receive channels corresponding to antennas in the second target antennas, calibration compensation values of the receive channels corresponding to the antennas in the second target antennas; and performing calibration processing on the receive channels corresponding to the antennas in the second target antennas;

when the transceiver 1102 is controlled to transmit calibration signals by using the second target antennas in the antenna array 1103 and receive the calibration signals by using the first target antennas in the antenna array 1103, separately determining, based on a difference value between amplitude-phase responses of transmit channels corresponding to the antennas in the second target antennas, calibration compensation values of the transmit channels corresponding to the antennas in the second target antennas, and performing calibration processing on the transmit channels corresponding to the antennas in the second target antennas, and separately determining, based on a difference value between amplitude-phase responses of receive channels corresponding to the antennas in the first target antennas, calibration compensation values of the receive channels corresponding to the antennas in the first target antennas, and performing calibration processing on the receive channels corresponding to the antennas in the first target antennas.

In an optional implementation, a calibration signal transmitted by an antenna in the antenna array 1103 is an orthogonal frequency division multiplexing (OFDM) signal, and subcarriers corresponding to each antenna in the antenna array 1103 are divided with a transmission comb comb M in a frequency division manner, where M is greater than or equal to a quantity of antennas included in the antenna array 1103.

In an optional implementation, the first target antennas are odd-numbered antennas in the antenna array 1103, and the second target antennas are even-numbered antennas in the antenna array 1103.

In an optional implementation, the first target antennas are even-numbered antennas in the antenna array 1103, and the second target antennas are odd-numbered antennas in the antenna array 1103.

Specifically, the antenna array calibration apparatus described in this embodiment of the present disclosure may implement some or all procedures in the embodiment of the antenna array calibration method described in the present disclosure with reference to FIG. 6A and FIG. 6B.

In this embodiment of the present disclosure, according to the antenna array calibration apparatus shown in FIG. 11, features of coupling factors of adjacent antennas are ensured by adding a radio frequency coupling component in the antenna array, thereby implementing consistency calibration on the antenna array by using an antenna air interface coupling feature, and satisfying reciprocity calibration while ensuring consistency calibration.

It should be noted that, for brief descriptions, the foregoing method embodiments are represented as a series of actions. However, a person skilled in the art should appreciate that the present disclosure is not limited to the described order of the actions, because according to the present disclosure, some steps may be performed in other orders or simultaneously. In addition, a person skilled in the art should also appreciate that all the embodiments described in the specification are preferred embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

A sequence of the steps of the method in the embodiments of the present disclosure may be adjusted, and steps may be merged or removed according to an actual requirement.

The units in the apparatus in the embodiments of the present disclosure may be combined, divided, or deleted according to an actual requirement.

A person of ordinary skill in the art may understand that, all or a part of the steps in each method of the foregoing embodiments may be implemented by a program instructing related hardware. The program may be stored in a computer readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM), or another optical disk memory, magnetic disk memory, magnetic tape memory, or any other computer readable medium that can be configured to carry or store data.

The antenna array calibration method and apparatus provided in the embodiments of the present disclosure are described in detail above. In this specification, specific examples are used to describe the principle and implementations of the present disclosure, and the description of the embodiments is only intended to help understand the method and core idea of the present disclosure. In addition, a person of ordinary skill in the art may, based on the idea of the present disclosure, make modifications with respect to the specific implementations and the application scope. In conclusion, the content of this specification shall not be construed as a limitation on the present disclosure.

What is claimed is:

1. An antenna array calibration method for use with an antenna array comprising first target antennas, second target antennas, a first antenna dummy element and a second antenna dummy element at one end of the antenna array, and a third antenna dummy element and a fourth antenna dummy element at the other end of the antenna array, wherein the first antenna dummy element and the fourth antenna dummy element are configured to receive calibration signals, the second antenna dummy element and the third antenna dummy element are configured to transmit calibration signals, an amplitude-phase response of the first antenna dummy element is the same as an amplitude-phase response of the fourth antenna dummy element, an amplitude-phase response of the second antenna dummy element is the same as an amplitude-phase response of the third antenna dummy element, and a difference value between coupling factors of adjacent antennas in the antenna array is less than a preset value, the method comprising:
   when the first target antennas transmit calibration signals and the second target antennas receive the calibration signals, separately determining, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and performing calibration processing on the transmit channels corresponding to the antennas in the first target antennas;
   separately determining, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and performing calibration processing on the receive channels corresponding to the antennas in the second target antennas;
   when the second target antennas transmit calibration signals and the first target antennas receive the calibration signals, separately determining, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and performing calibration processing on the transmit channels corresponding to the antennas in the second target antennas; and
   separately determining, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and performing calibration processing on the receive channels corresponding to the antennas in the first target antennas.

2. The method according to claim 1, wherein a calibration signal transmitted by an antenna in the antenna array is an orthogonal frequency division multiplexing OFDM signal, and subcarriers corresponding to each antenna in the antenna array are divided with a transmission comb N in a frequency division manner, wherein N is greater than or equal to a quantity of antennas comprised in the antenna array.

3. The method according to claim 1, wherein the first target antennas are odd-numbered antennas in the antenna array, and the second target antennas are even-numbered antennas in the antenna array.

4. The method according to claim 1, wherein the first target antennas are even-numbered antennas in the antenna array, and the second target antennas are odd-numbered antennas in the antenna array.

5. An antenna array calibration method for use with an antenna array comprising first target antennas, second target antennas, a receive coupling component between a first antenna in the first target antennas and a second antenna in the second target antennas, and a transmit coupling component between a third antenna in the first target antennas and a fourth antenna in the second target antennas, wherein the receive coupling component is configured to couple and receive calibration signals, the transmit coupling component is configured to transmit and couple calibration signals, and a difference value between coupling factors of adjacent antennas in the antenna array is less than a preset value, the method comprising:
   controlling the first antenna and the second antenna to separately transmit calibration signals;
   receiving the calibration signals using the receive coupling component;
   separately determining, based on the calibration signals received by the receive coupling component, the calibration signal transmitted by the first antenna and the calibration signal transmitted by the second antenna, a calibration compensation value of a transmit channel corresponding to the first antenna and a calibration compensation value of a transmit channel corresponding to the second antenna;
   separately performing calibration processing on the transmit channel corresponding to the first antenna and the transmit channel corresponding to the second antenna such that an amplitude-phase response of the transmit channel corresponding to the first antenna is consistent with an amplitude-phase response of the transmit channel corresponding to the second antenna;
   transmitting calibration signals by using the transmit coupling component;
   controlling the third antenna and the fourth antenna to separately receive the calibration signals;
   separately determining, based on the calibration signals transmitted by the transmit coupling component, the calibration signal received by the third antenna and the calibration signal received by the fourth antenna, a calibration compensation value of a receive channel corresponding to the third antenna and a calibration compensation value of a receive channel corresponding to the fourth antenna; and
   separately performing calibration processing on the receive channel corresponding to the third antenna and the receive channel corresponding to the fourth antenna such that an amplitude-phase response of the receive channel corresponding to the third antenna is consistent with an amplitude-phase response of the receive channel corresponding to the fourth antenna;
   when the first target antennas transmit calibration signals and the second target antennas receive the calibration signals, separately determining, based on a difference value between amplitude-phase responses of transmit channels corresponding to antennas in the first target antennas, calibration compensation values of the transmit channels corresponding to the antennas in the first target antennas, and performing calibration processing on the transmit channels corresponding to the antennas in the first target antennas;

separately determining, based on a difference value between amplitude-phase responses of receive channels corresponding to antennas in the second target antennas, calibration compensation values of the receive channels corresponding to the antennas in the second target antennas, and performing calibration processing on the receive channels corresponding to the antennas in the second target antennas;

when the second target antennas transmit calibration signals and the first target antennas receive the calibration signals, separately determining, based on a difference value between amplitude-phase responses of transmit channels corresponding to the antennas in the second target antennas, calibration compensation values of the transmit channels corresponding to the antennas in the second target antennas, and performing calibration processing on the transmit channels corresponding to the antennas in the second target antennas; and separately determining, based on a difference value between amplitude-phase responses of receive channels corresponding to the antennas in the first target antennas, calibration compensation values of the receive channels corresponding to the antennas in the first target antennas, and performing calibration processing on the receive channels corresponding to the antennas in the first target antennas.

6. The method according to claim 5, wherein a calibration signal transmitted by an antenna in the antenna array is an orthogonal frequency division multiplexing (OFDM) signal, and subcarriers corresponding to each antenna in the antenna array are divided with a transmission comb comb M in a frequency division manner, wherein M is greater than or equal to a quantity of antennas comprised in the antenna array.

7. The method according to claim 5, wherein the first target antennas are odd-numbered antennas in the antenna array, and the second target antennas are even-numbered antennas in the antenna array.

8. The method according to claim 5, wherein the first target antennas are even-numbered antennas in the antenna array, and the second target antennas are odd-numbered antennas in the antenna array.

9. An antenna array calibration apparatus, comprising:
an antenna array comprising first target antennas and second target antennas;
a first antenna dummy element and a fourth antenna dummy element configured to receive calibration signals, wherein an amplitude-phase response of the first antenna dummy element is the same as an amplitude-phase response of the fourth antenna dummy element;
a second antenna dummy element and a third antenna dummy element configured to transmit calibration signals, wherein an amplitude-phase response of the second antenna dummy element is the same as an amplitude-phase response of the third antenna dummy element, and wherein a difference value between coupling factors of adjacent antennas in the antenna array is less than a preset value;
a processor; and a memory configured to store data and a program which, when execute by the processor, causes the antenna array calibration apparatus to:
when the first target antennas transmit calibration signals and the second target antennas receive the calibration signals, separately determine, based on a difference value between each of amplitude-phase responses of transmit channels corresponding to antennas in the first target antennas and the amplitude-phase response of the third antenna dummy element, calibration compensation values of the transmit channels corresponding to the antennas in the first target antennas, and perform calibration processing on the transmit channels corresponding to the antennas in the first target antennas, separately determine, based on a difference value between each of amplitude-phase responses of receive channels corresponding to antennas in the second target antennas and the amplitude-phase response of the fourth antenna dummy element, calibration compensation values of the receive channels corresponding to the antennas in the second target antennas, and perform calibration processing on the receive channels corresponding to the antennas in the second target antennas, when the second target antennas transmit calibration signals and the first target antennas receive the calibration signals, separately determine, based on a difference value between each of amplitude-phase responses of transmit channels corresponding to the antennas in the second target antennas and the amplitude-phase response of the second antenna dummy element, calibration compensation values of the transmit channels corresponding to the antennas in the second target antennas, and perform calibration processing on the transmit channels corresponding to the antennas in the second target antennas, and separately determine, based on a difference value between each of amplitude-phase responses of receive channels corresponding to the antennas in the first target antennas and the amplitude-phase response of the first antenna dummy element, calibration compensation values of the receive channels corresponding to the antennas in the first target antennas, and perform calibration processing on the receive channels corresponding to the antennas in the first target antennas.

10. The apparatus according to claim 9, wherein a calibration signal transmitted by an antenna in the antenna array is an orthogonal frequency division multiplexing (OFDM) signal, and subcarriers corresponding to each antenna in the antenna array are divided with a transmission comb comb N in a frequency division manner, wherein N is greater than or equal to a quantity of antennas comprised in the antenna array.

11. The apparatus according to claim 9, wherein the first target antennas are odd-numbered antennas in the antenna array, and the second target antennas are even-numbered antennas in the antenna array.

12. The apparatus according to claim 9, wherein the first target antennas are even-numbered antennas in the antenna array, and the second target antennas are odd-numbered antennas in the antenna array.

* * * * *